United States Patent [19]

Burson et al.

[11] 4,161,726

[45] Jul. 17, 1979

[54] DIGITAL JOYSTICK CONTROL

[75] Inventors: David C. Burson, Garland; Harold D. Larson, Plano, both of Tex.

[73] Assignee: Texas Instruments Incorporated, Dallas, Tex.

[21] Appl. No.: 785,144

[22] Filed: Apr. 6, 1977

[51] Int. Cl.$^2$ .............................................. G06F 3/02
[52] U.S. Cl. ........................... 340/365 R; 74/471 XY; 200/6 A
[58] Field of Search ................. 340/365 R, 365 S, 204, 340/347 P, 365 P; 200/1 R, 6 R, 6 A; 74/471 XY; 338/128

[56] References Cited

U.S. PATENT DOCUMENTS

| | | | |
|---|---|---|---|
| 3,056,867 | 10/1962 | Eitel | 200/6 A |
| 3,268,885 | 8/1966 | Coyle et al. | 340/347 P |
| 3,629,775 | 12/1971 | Kindred | 338/128 |
| 3,745,966 | 7/1973 | Seager | 74/471 XY |
| 3,770,915 | 11/1973 | Bennett | 200/6 A |
| 3,795,882 | 3/1974 | Tokubo | 338/128 |
| 3,824,354 | 7/1974 | Anderson et al. | 340/365 R |

OTHER PUBLICATIONS

*IBM Technical Disclosure Bulletin*, "Coded Sphere Joystick", Carmichael, vol. 19, No. 6, Nov. 1976, pp. 2226–2227.

*Primary Examiner*—John W. Caldwell, Sr.
*Assistant Examiner*—James J. Groody
*Attorney, Agent, or Firm*—William K. McCord; Stephen S. Sadacca; Melvin Sharp

[57] ABSTRACT

A digital joystick control includes an elongated shaft member having a spherical ball at one end thereof. First and second socket members are coupled to the joystick to provide a swivel joint between the ball and the socket members enabling movement of the shaft about the ball in any direction; movement of the joystick effects corresponding movement of the socket members. Each of the socket members is connected to a plate member which moves therewith. The plate members have a patterned surface presenting conductive and non-conductive regions in opposing relation to wiper arms which engage the patterned surfaces. The patterned surfaces are coded in such a manner that the locations of the conductive and non-conductive regions of the patterned surfaces with respect to the wiper arms are changeable in response to movement of the shaft of the joystick whereby a unique digital-coded positional signal is generated for preselected incremental positions of the shaft.

7 Claims, 25 Drawing Figures

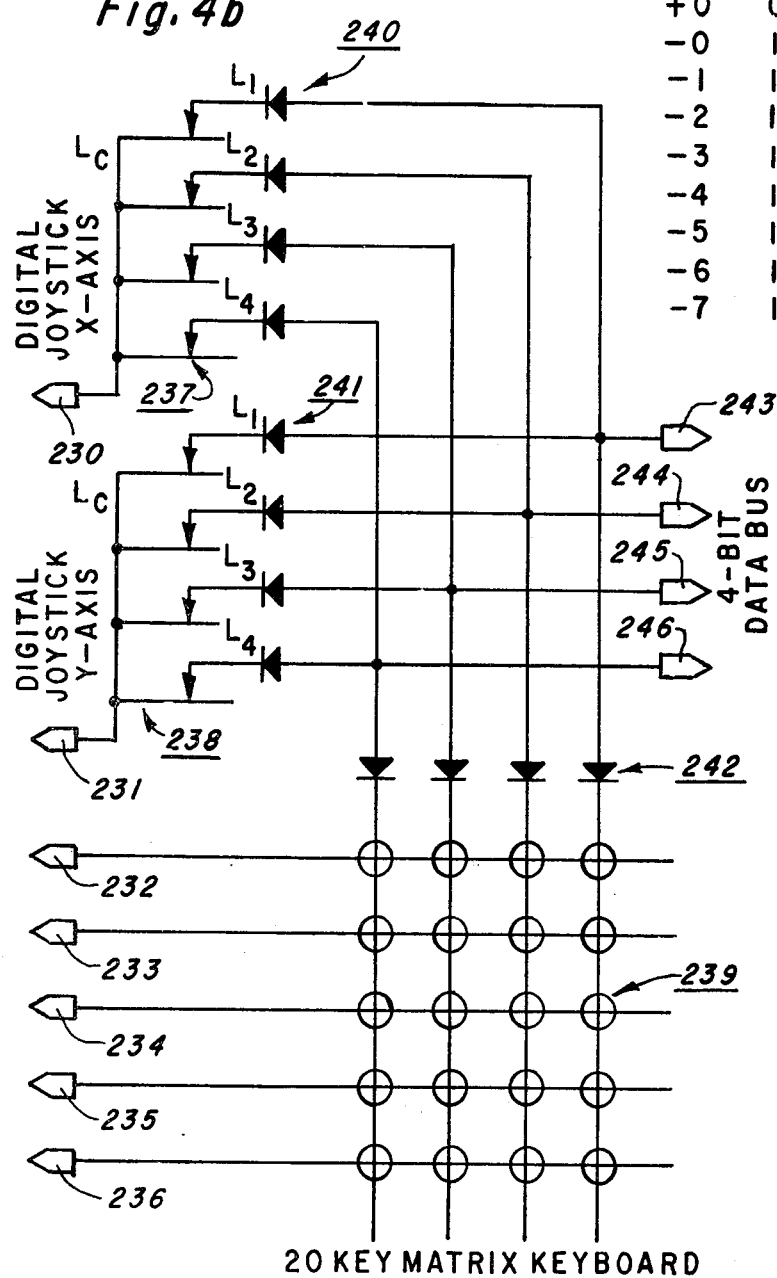
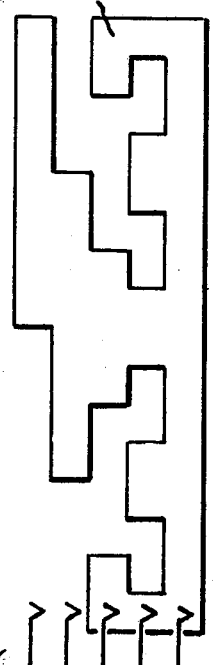

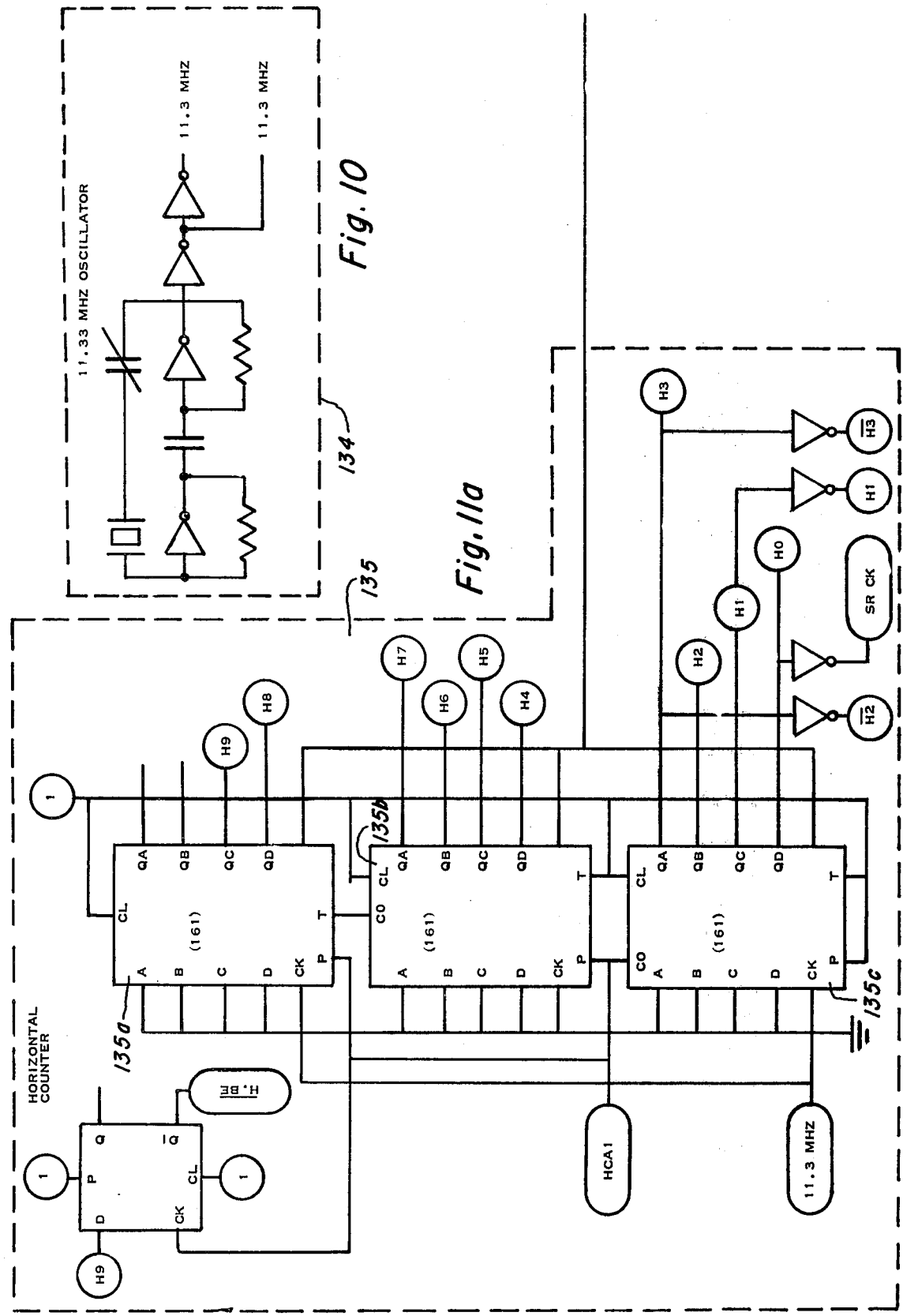

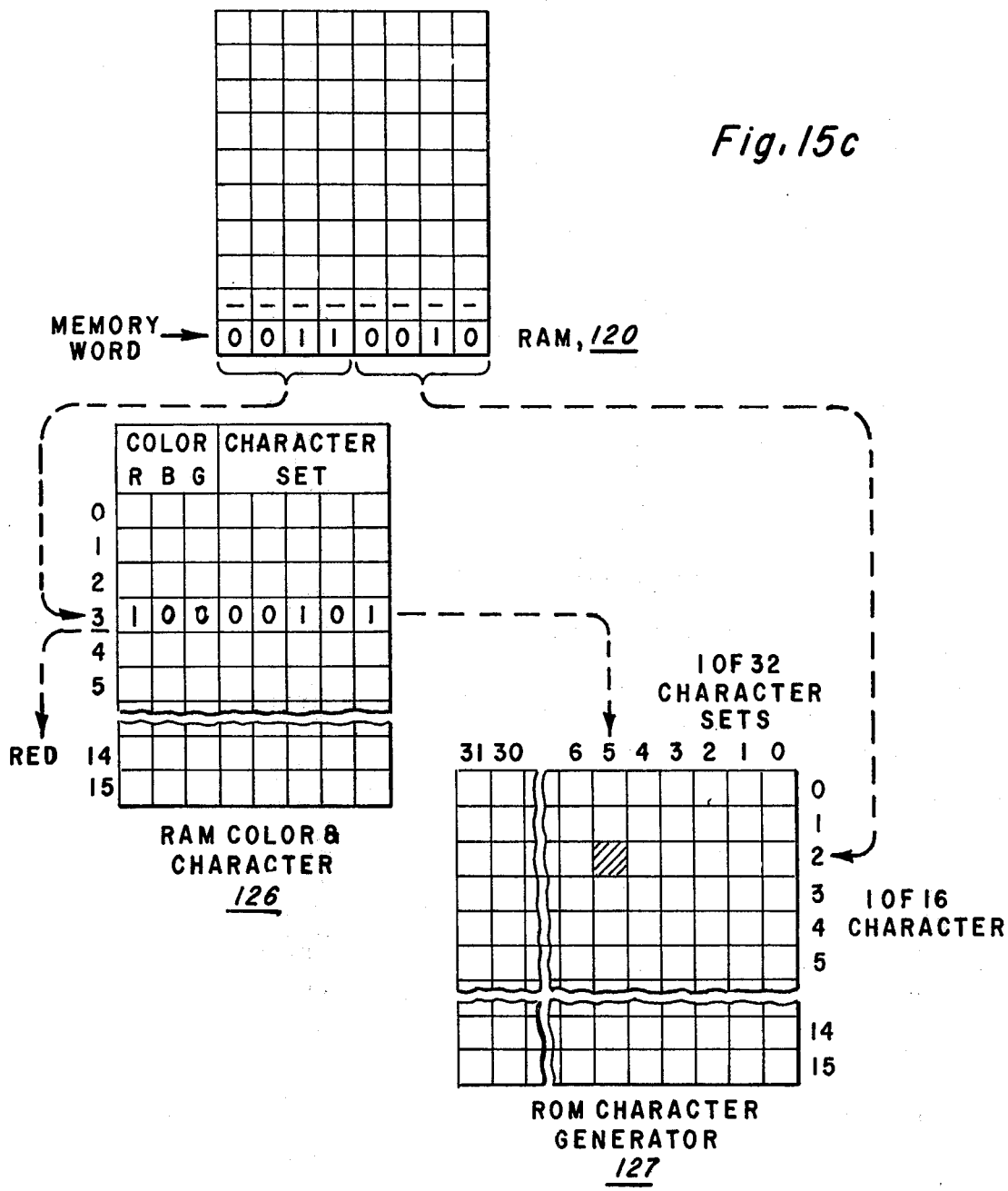

DIGITAL JOYSTICK CONTROL

BACKGROUND OF THE INVENTION

This invention relates to joystick controls for selectively altering electrical signals in accordance with the relative position of the joystick control and, more particularly, to a joystick control which generates digitally-coded signals.

This invention further relates to copending U.S. Patent Application Ser. No. 785,006 by Kastner et al, entitled System for Displaying Character and Graphic Information on a Color Video Display; Ser. No. 785,145, by Burson, entitled A Digital Joystick Control Interface System for Video Games and the Like; and Ser. No. 785,143 by Burson, entitled System to Control Velocity Vector of a Display Cursor, each filed of even date with and assigned to the Assignee of the present invention. This invention also relates to Ser. No. 791,913, by Trenkler et al, entitled Video Game with Portable Control Units, filed Apr. 28, 1977 and assigned to the Assignee of the present invention.

Prior art joystick controls, which alter electrical signals, have been of the analog type in which potentiometers are mounted in controlled relation to the joystick; one of the potentiometers being controlled with joystick movement in the X direction, and the other being controlled with joystick movement in the Y direction. The position of the joystick thereby determines the relative resistances of the two potentiometers which, in turn, alter electrical signals. If a digital signal is required to control a digital processor or the like, an analog-to-digital conversion circuit is required.

It is an object of the invention to provide an improved joystick control.

It is another object of the present invention to provide a digital joystick which directly generates digital-coded signals indicative of the X-Y position of the joystick.

BRIEF DESCRIPTION OF THE INVENTION

These and other objects are accomplished in accordance with the present invention in which a joystick control is provided which directly generates digital-coded signals indicative of the position of the joystick. The joystick control includes an elongated shaft forming a joystick with a spherical ball formed on one end thereof. A pair of socket members are mounted in relation to the joystick to provide a swivel joint between the ball and socket members enabling movement of the shaft about the ball in any direction with relative movement of the shaft in the X direction affecting movement of one of the socket members, and relative movement of the shaft in the Y direction affecting movement of the other socket member. A plate member is coupled to each of the socket members for movement therewith. Each of the plate members has a patterned surface presenting conductive and non-conductive regions in opposing relation to wiper arms which engage the patterned surfaces. The patterned surfaces represent digital position codes; the locations of the conductive and non-conductive regions of the patterned surfaces with respect to the wiper arms are changeable in response to movement of the shaft of the joystick whereby digital X and Y codes generated by the patterned surfaces are provided to the wiper arms.

One digital joystick embodying the present invention is comprised of a platform having a centrally-located circular opening provided therein. A base member having respective pairs of side and end support members define a chamber in registration with the circular opening in the platform from which the base member depends. The joystick, which is manually controlled, includes an elongated shaft having a spherical ball being partially received within the chamber formed by the base member and protruding outwardly of the circular opening of the platform. First and second socket members are mounted within the chamber formed by the base member. The first socket member is cup-shaped so that the spherical ball is seated therewithin, has an elongated slot disposed substantially perpendicular to the side support members by means of an axle member for movement about an axis perpendicular to the side members. The second socket member comprises an arcuate strap extending about the cup-shaped member in traverse relationship thereto, has an elongated groove disposed substantially perpendicular to the end support members, and is pivotably connected to the end support members by means of an axle member for movement about an axis perpendicular to the end support members. The spherical ball includes a pin member extending through the slot in the first socket member and into the groove in the second socket member thereby interconnecting the socket members with the joystick to provide a swivel joint between the ball and socket members, and enabling movement of the shaft about the ball in any direction with respect to the platform. A first circuit board is mounted in spaced relationship to one of the end support members, and a second circuit board is mounted in spaced parallel relation to one of the side support members. A plurality of wiper arms extend outwardly of each of the circuit boards. Respective arcuate plate members comprised of conductive material are fixably connected to each of the socket members for movement therewith. The conductive plates each have a digital-coded patterned surface presenting conductive and non-conductive regions in opposing relation to the respective sets of wiper arms so that a digital-coded representation of the X-Y position of the shaft member is generated by the wiper arms in accordance with the coded pattern of the plate members.

BRIEF DESCRIPTION OF THE DRAWINGS

Still further objects and advantages of the invention will be apparent from the detailed description and claims when read in conjunction with the accompanying drawings wherein:

FIG. 3b is a side elevational view of the joystick control of FIG. 3a;

FIG. 3c is a front elevational view of the joystick control of FIG. 3a;

FIG. 3d is a top view of the joystick control of FIG. 3a;

FIG. 4a is a graphic representation of the coding of the arcuate plates utilized in the joystick control of FIG. 3a;

FIG. 4b is a circuit diagram of the digital joystick of FIG. 3a, keyboard, and novel interface circuit;

FIG. 10 is a circuit diagram of the timing oscillator;

FIG. 11a is a circuit diagram of horizontal counter 135;

FIG. 15c is a graphic representation of the novel inter-memory addressing technique of the display, character table and character generator memories.

VIDEO GAME SYSTEM

Figure 1:
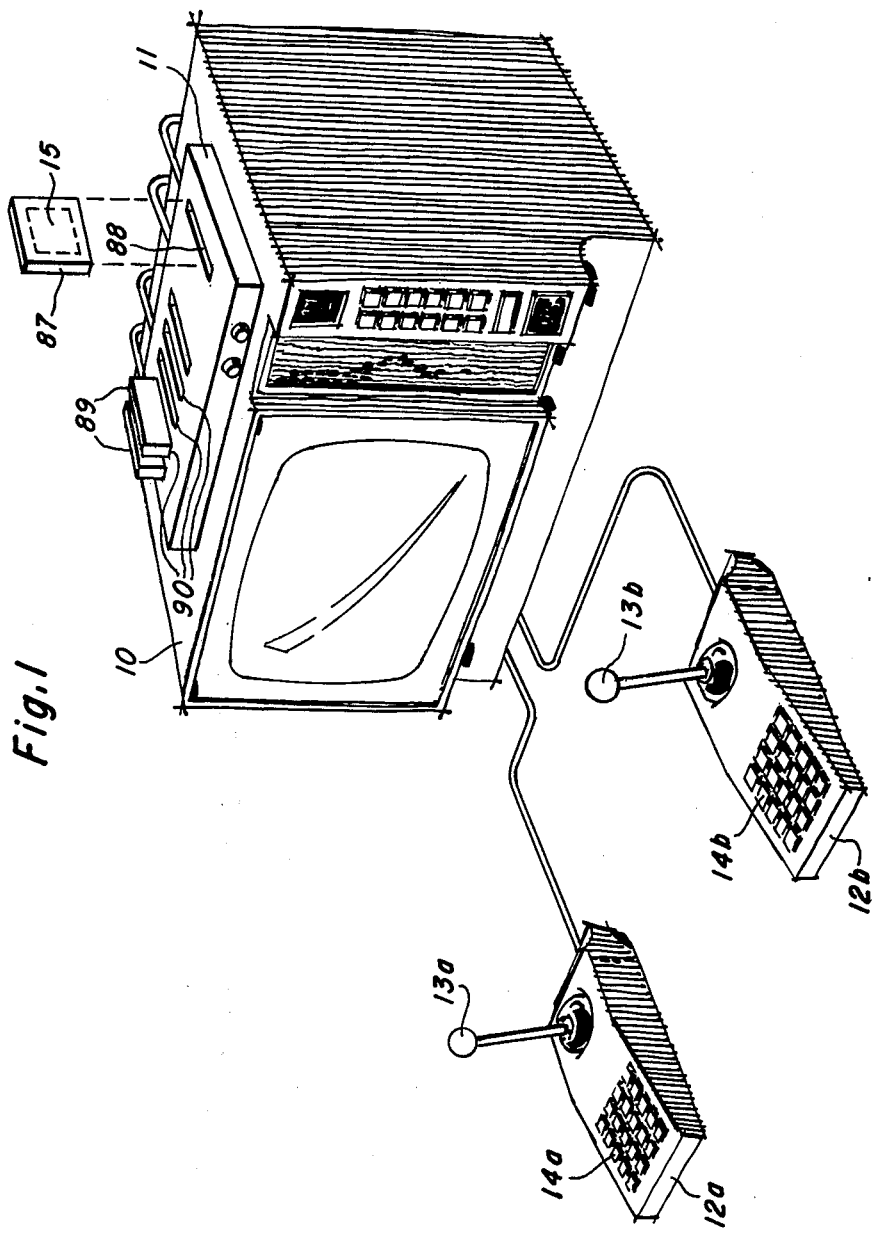
FIG. 1 is a perspective view of a video game system embodying the present invention.

A video game system embodying the present invention is illustrated in FIG. 1. Referring to FIG. 1, the video game system is comprised of a main module 11 which is coupled to the antenna terminal of television set 10 and one or more remote control units 12a, 12b which are coupled to the main module 11 by means of cables or the like. In the present embodiment, each of the remote control units 12a, 12b include a joystick control 13a, 13b and a keyboard 14a, 14b. Operation of the joystick 13a, 13b and/or keyboard 14a, 14b determines the play of the game. Games are selected by plugging a selected module 87 into a module receiving socket 88. The present video game system is controlled by a microprocessor or microcomputer, the operation of which is determined by a stored program, different stored programs being utilized for each game or set of games. In one embodiment, the microprocessor is contained within the module 11 and a read-only memory containing a particular stored program for a particular game or set of games contained within module 87. In another embodiment, a microcomputer, which is a complete processor including a stored program ROM fabricated on a single semiconductor chip, is contained within the cartridge 87. Slots 90 may be provided in the main module 11 for storage of additional cartridges 89 each containing different stored programs for control of different games.

As previously mentioned, the plug-in cartridge may contain either a ROM or a complete microcomputer. For purpose of convenience, the latter embodiment will herein be described in detail, noting that the former system is electrically equivalent, the only difference being that in the former system, the stored program memory is contained in the plug-in unit, and the remainder of the described circuitry is contained in separate semiconductor chips within the module 11.

Figure 2A:
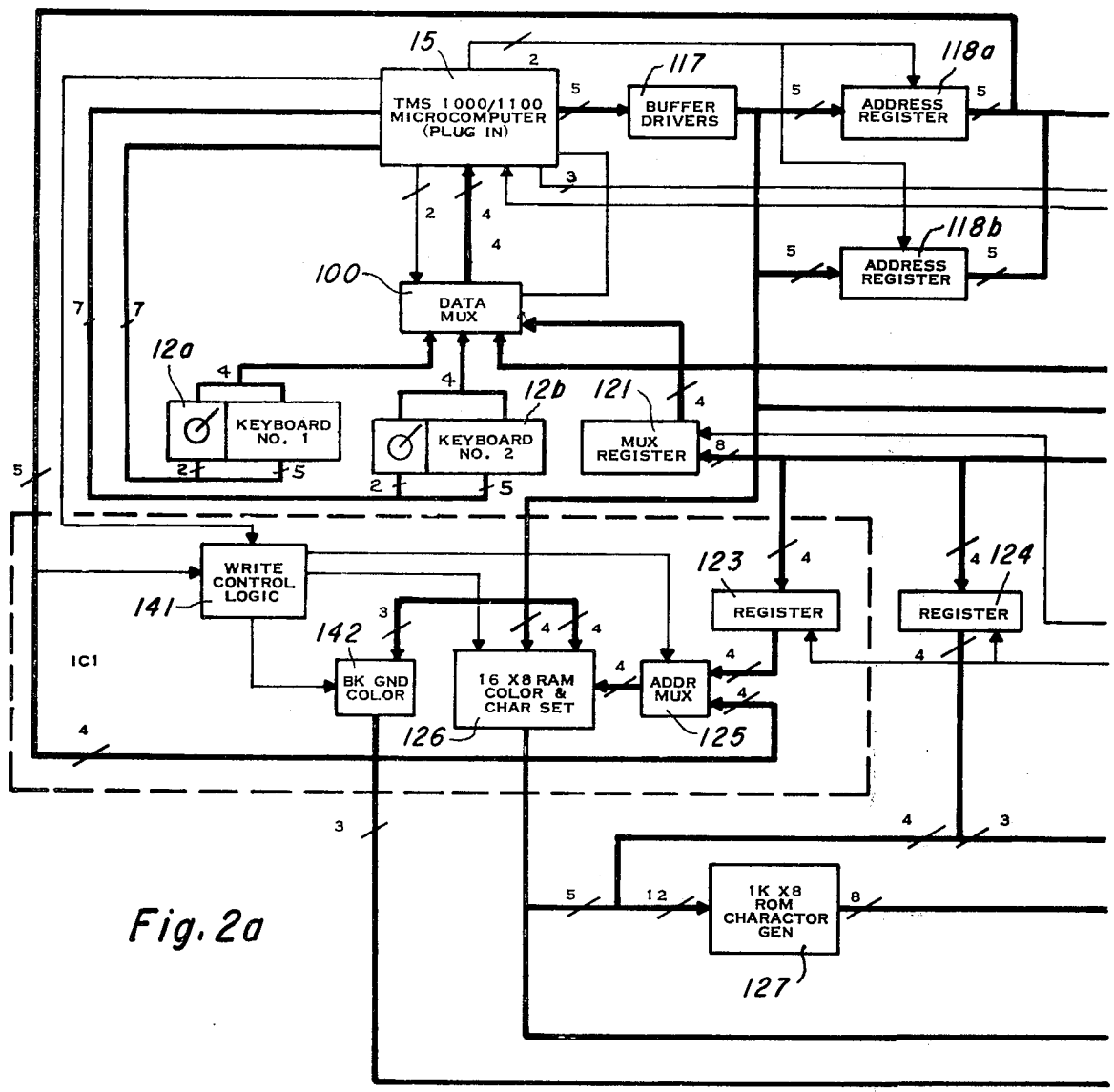
FIGS. 2a and 2b comprise a block diagram of the video game system of FIG. 1.
Figure 2B:
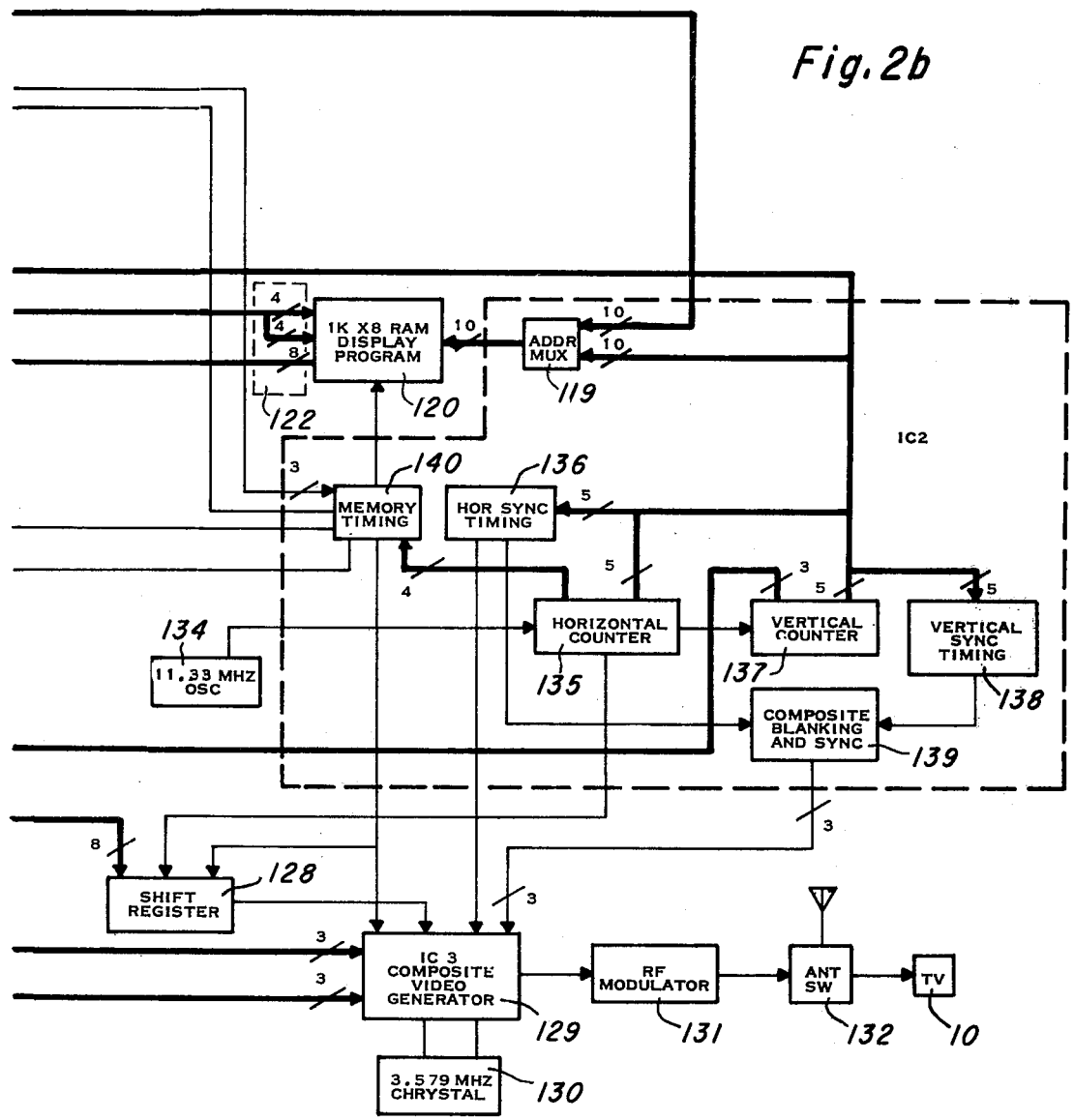
Figure 3A:
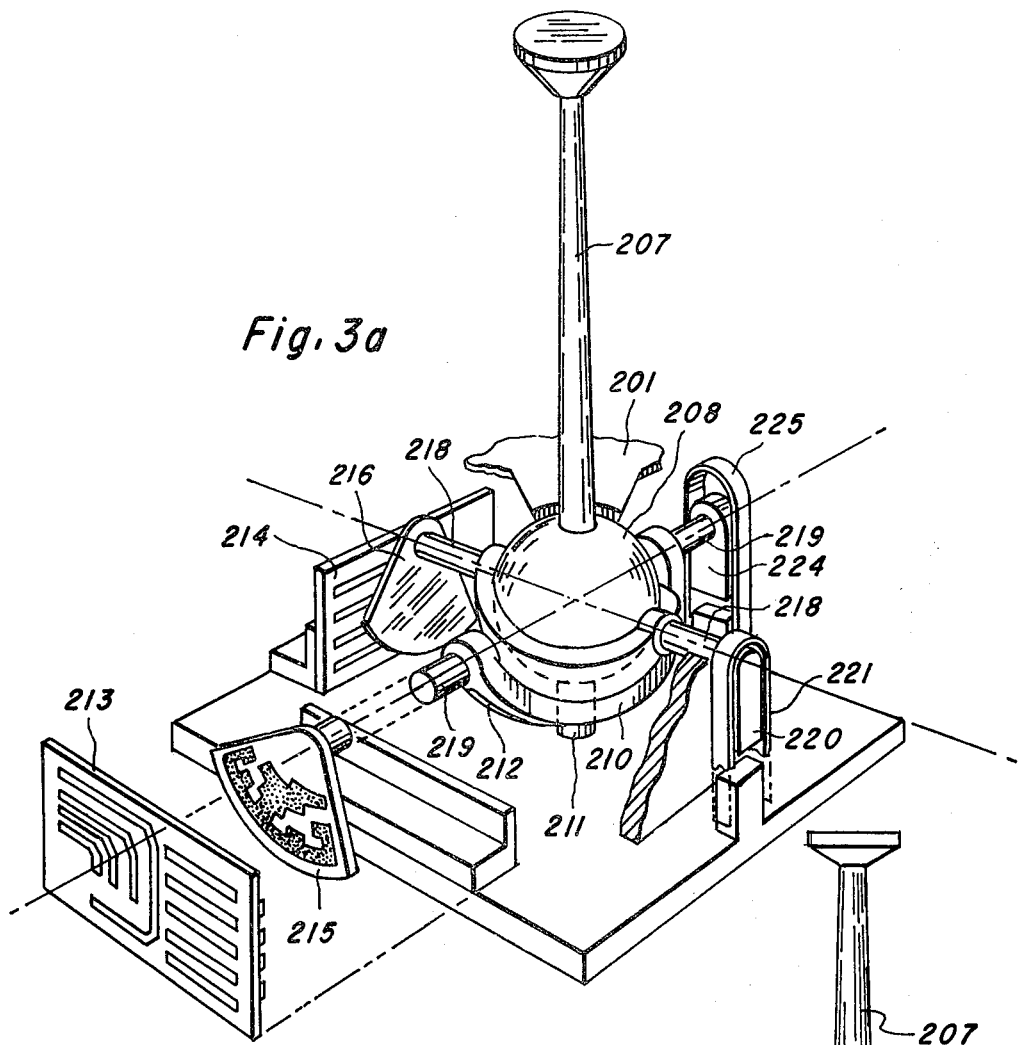
FIG. 3a is a perspective view of a novel digital joystick control utilized in the video game system of FIG. 1.
Figure 3B:
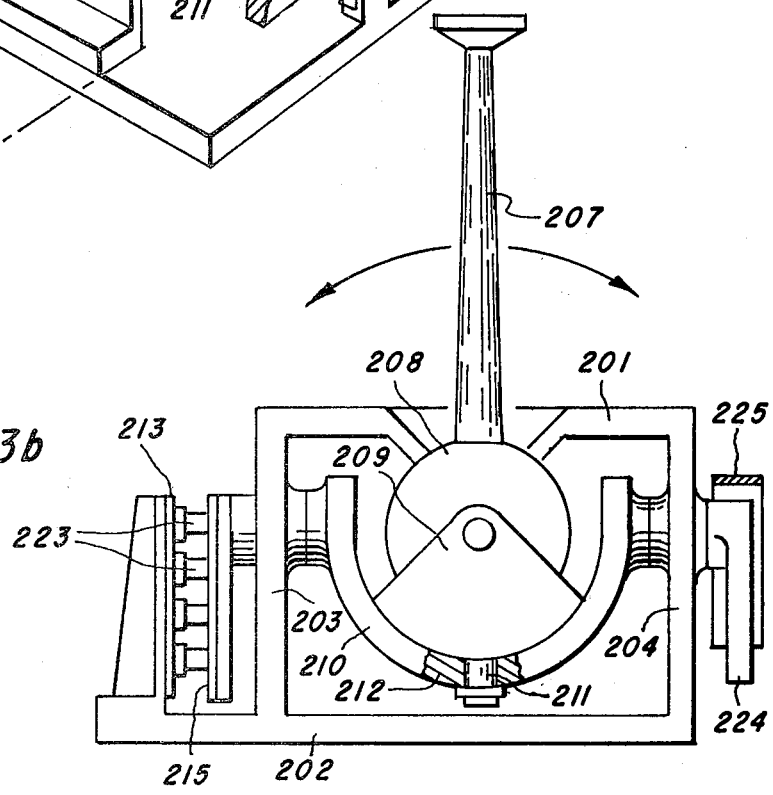
Figure 3C:
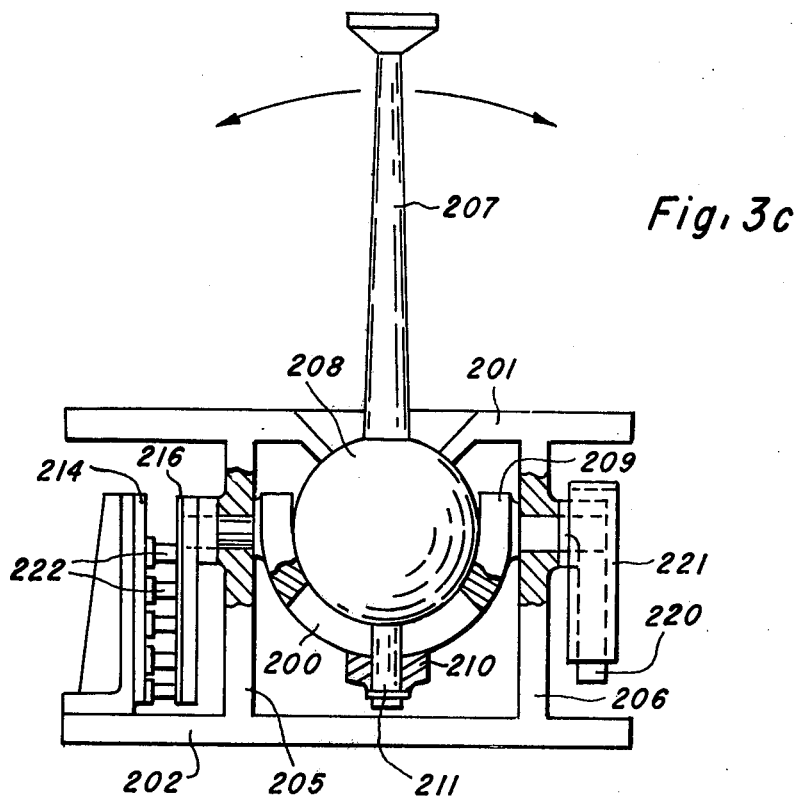
Figure 3D:
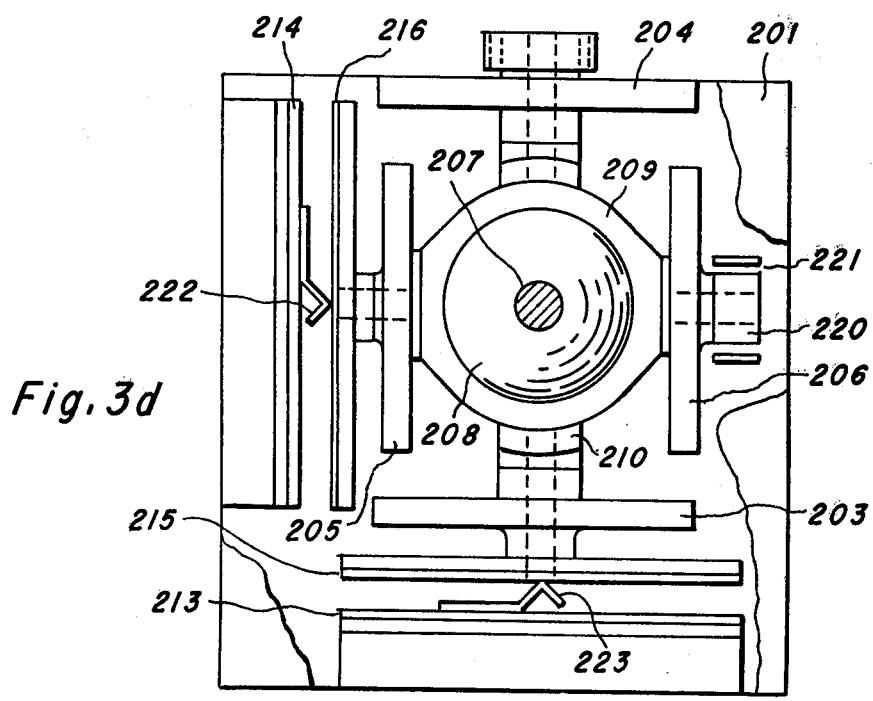

Referring then to FIGS. 2a and 2b, a block diagram of a video game system embodying the present invention is shown. As illustrated in FIGS. 1 and 2a, each of the remote control units 12a, 12b are coupled to the main video game module 11 by means of an 11-conductor cable. The digital joystick control and remote control interface which are inventive features of the video game system will next be described in detail with respect to FIGS. 3a–3d, 4a and 4b.

DIGITAL JOYSTICK

Referring to FIGS. 3a–3d, each digital joystick control 13a, 13b is comprised of a platform 201 having a centrally-located circular opening provided therein. A base member 202 having respective pairs of side support members such as side walls 205 and 206 and end support members such as end walls 203 and 204 define a chamber in registration with the circular opening in platform 201 from which base member 202 depends. The joystick, which is manually controlled by the player, includes an elongated shaft 207 having a spherical ball 208 on one end thereof. Elongated shaft 207 is disposed outwardly of platform 201 with spherical ball 208 being partially received within the chamber formed by base member 202 and protruding outwardly of the circular opening in platform 201. First and second socket members 209 and 210 are mounted within the chamber formed by base member 202. Socket member 209 is cup-shaped so that spherical ball 208 is seated there within. Cup-shaped member 209 has an elongated slot 200 disposed substantially perpendicular to side walls 205 and 206 of base member 202, and is pivotally connected to side walls 205 and 206 by means of axle member 218 for movement about an axis perpendicular to side walls 205 and 206. Socket member 210 comprises an arcuate strap extending about cup-shaped member 209 in traverse relationship thereto. Socket member 210 has an elongated groove 212 disposed substantially perpendicular to end walls 203 and 204, and is pivotally connected to end walls 203 and 204 by means of axle member 219 for movement about an axis perpendicular to end walls 203 and 204. Spherical ball 208 includes pin member 211 extending through slot 200 in socket member 209 and into groove 212 in socket member 210 thereby interconnecting socket members 209 and 210 with the joystick to provide a swivel joint between ball 208 and socket members 209 and 210 enabling movement of shaft 207 about ball 208 in any direction with respect to platform 201. Circuit board 213 is mounted in spaced parallel relation to end wall 203, and circuit board 214 is mounted in spaced parallel relation to side wall 205. A plurality of wiper arms 223 and 222 extend outwardly of circuit boards 213 and 214, respectively. Arcuate plates 215 and 216, comprised of a conductive material, are fixably connected to the socket members 210 and 209, respectively, for movement therewith. Arcuate plate 215 is mounted exteriorly with respect to end wall 203, and is associated with circuit board 213; arcuate plate 216 is mounted exteriorly with respect to end wall 205, and is associated with circuit board 214. Conductive plates 215 and 216 each have a patterned surface presenting conductive and non-conductive regions in opposing relation to wiper arms 223 and 222, respectively. In the present embodiment, conductive plates 215 and 216 are coded so that a "GRAY" code representation of the X-Y position of shaft 207 is generated by wiper arms 222 and 223; the "GRAY" code is transmitted from wiper arms 222 and 223 to main module 11 of the video game system whereby conduct of the game is altered.

Each joystick 207 is normally in the upright position, and maintained in such position by spring members 221 and 225 which respectively bias members 220 and 224. Member 220 is connected to socket member 209 by means of axle 218 and member 224 is connected to socket member 210 by means of axle member 219. As the joystick 207 is moved from the upright position, spring members 221 and 225 apply a biasing pressure to joystick 207 through members 220 and 224, respectively, thereby making the maneuverability of the joystick 207 less sensitive and more accurately controllable.

The electrical operation of joystick controls 13a and 13b and the interface circuitry between joystick controls 13a and 13b, keyboards 14a and 14b and microcomputer 15 which is plugged into main module 11 is best understood with reference to FIGS. 4a and 4b.

Referring then to FIG. 4a, the conductive and non-conductive portions of one of the arcuate plates 215, 216 of one of the joystick controls 12a, 12b is shown in rectangular form for easier understanding. In the present embodiment, all of the arcuate plates have the same pattern. Each set of wiper arms 222, 223 is comprised of five independent wiper arms; four receiving wiper arms $L_1-L_4$ and a common wiper arm $L_C$. A voltage applied to common wiper arm $L_C$ is transmitted via the conductive portions of the respective plate 215, 216 and received by selected ones of wiper arms $L_1-L_4$ to thereby generate a "GRAY" coded signal indicative of the position of the joystick along the respective (X or Y) axis. The combined coded signals from both sets of wiper arms 222 and 223 provide microcomputer 15 with the complete X-Y position of the joystick 207.

The data output signals generated by switches 237 and 238 are interfaced to four lines 243-246 comprising a common data bus by utilizing diodes 240 and 241 for isolation and providing means for independently strobing $L_C$ terminals 230 and 231 to separately read the digital joystick X axis position, and the digital joystick Y axis position on the four lines 243-246 of the data bus. In the present embodiment, a 20-key keyboard 14a, 14b is also provided in each remote control unit 12a, 12b, as previously mentioned with respect to FIG. 1. The keyboard 14a, 14b is represented electrically in FIG. 4b by matrix 239. Terminals 230-236 are coupled to respective ones of digit terminals ($D_0-D_{12}$) 18 of microcomputer 15 (which is illustrated in detail in FIG. 6). Keyboard terminals 232-236 are strobed in strobing sequence with joystick terminals 230 and 231, and a 4-bit code indicative of an activated key in matrix 239 is thereby read out of the four lines 243-246 of the data bus at a predetermined time in the strobing sequence. Diodes 242 are provided to isolate the keyboard outputs from the joystick outputs to lines 243-246 of the data bus.

Figure 5:
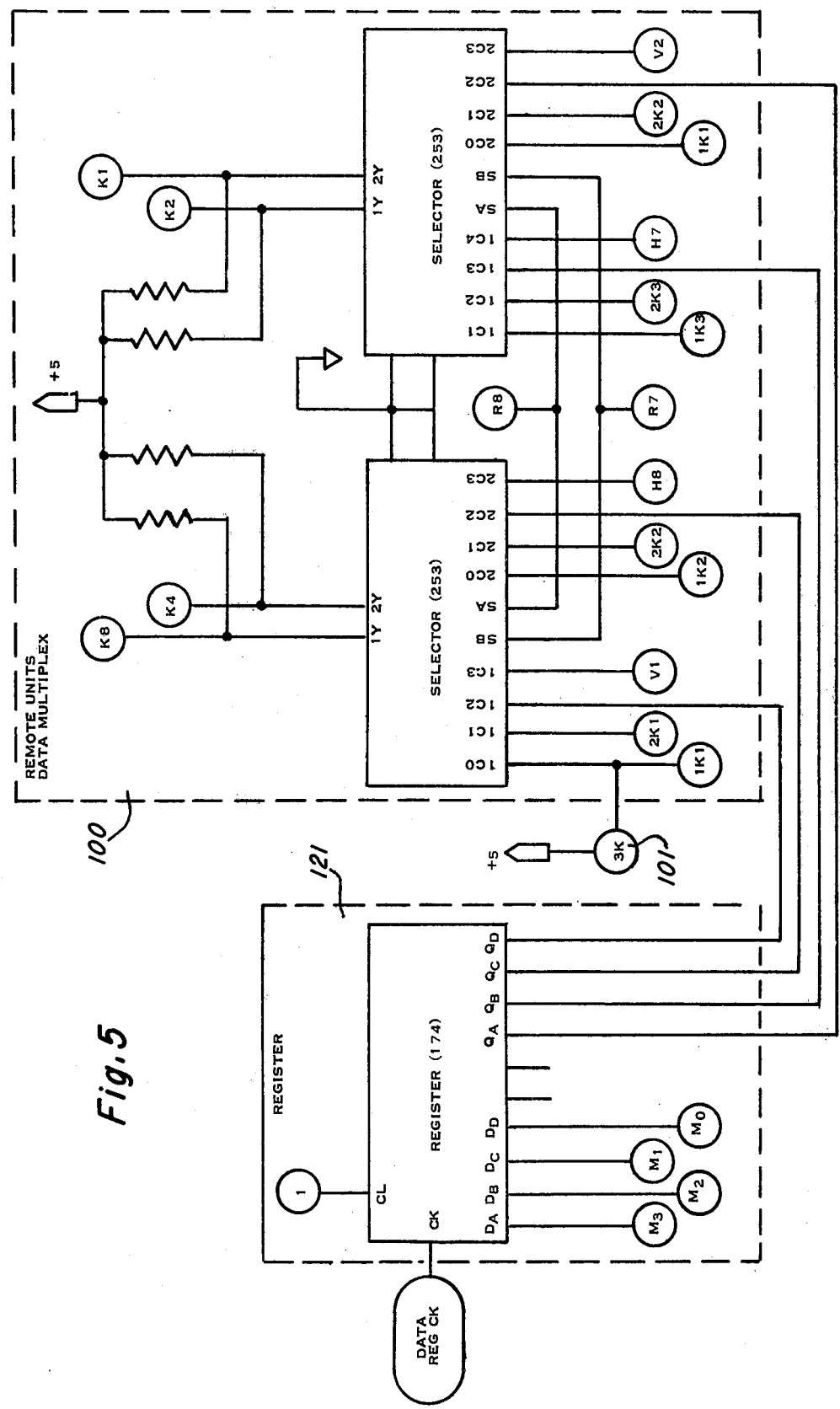
FIG. 5 is a circuit diagram of the data multiplex circuit coupling the remote control units of the video game system to the main module of the video game system of FIG. 1.

As illustrated in FIG. 2a, the four lines 243-246 comprising the data bus of each of remote control unit 12a, 12b are connected to data multiplexer 100 which provides for the separate sampling of data from each of the joystick control unit data busses input on terminals 1K1-1K4 and 2K1-2K4, the data lines M0-M3 from RAM 120 which data is stored in multiplexer register 121, or the data lines V1, V2, H7, H8 which are random number data derived from vertical counter 137 and horizontal counter 135. In the present embodiment, data multiplexer 100 is comprised of a pair of SN54/74LS253 integrated selector circuits as illustrated in FIG. 5; register 121 is an SN54/74LS174 integrated register circuit.

The interface which couples the four lines of each remote control unit data bus and multiplexer 100, in the present embodiment, includes pull-up resistors 101 which are connected, in main unit 11, to each data bus line. When the keyboard scan lines 232-236 and digital joystick scan lines 230 and 231 are "high", all of the data bus lines 243-246 are "high". When one of the digital joystick scan lines 230 or 231 is "low" and the other scan lines are "high", those of the digital joystick switch contacts 237 or 238 which are making contact with the scanned "low" scan line 230 or 231 will pull the corresponding ones of data bus lines 243-246 "low"; the other data lines remain in the "high" "pulled up" condition. In this manner, the relative X and Y positions of each joystick 13a, 13b is read out in scanned sequence to the respective data bus and the data busses are multiplexed along with the outputs of register 121 and to counters 135 and 137 provide four bits of data to keyboard inputs 16 (K1, K2, K4, K8) of microcomputer 15 which will later be described in detail with respect to FIG. 6.

As seen from the above-described embodiment, the remote control units 12a and 12b, each having a digital joystick control 13a, 13b with four bits of resolution per axis (X and Y) and a 20-key matrix keyboard 14a, 14b, and the microcomputer 15 which is located (after being plugged in) in main unit 11, are interfaced by a total of eleven lines (seven scan lines 230-236 and the four data lines 243-246) rather than the 18 conductors normally required (9 for the digital joystick and 9 for the keyboard) without the need for a multiplexer circuit connected in the remote control unit 12a, 12b.

Figure 6:
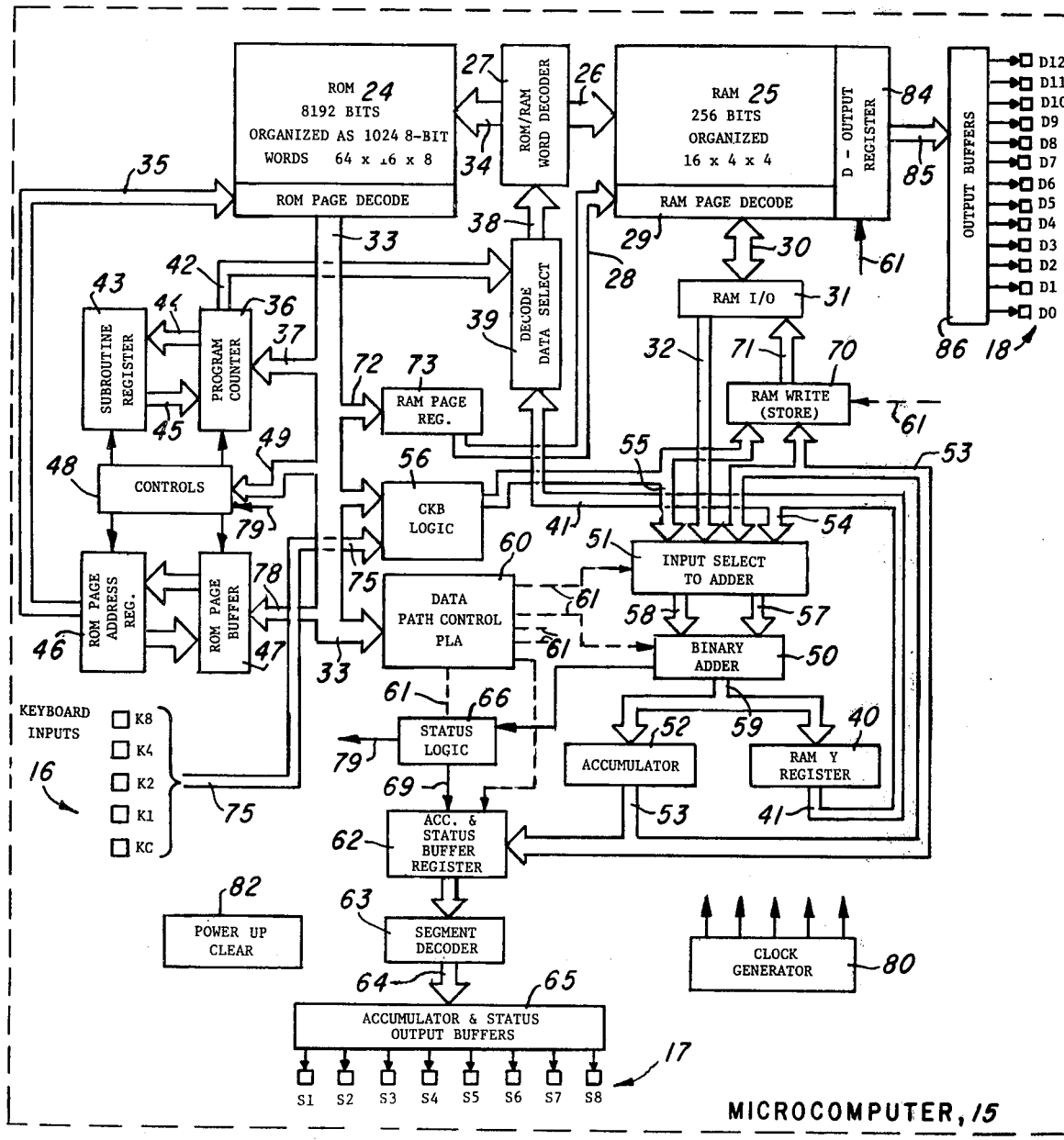
FIG. 6 is a block diagram of the microcomputer utilized to control the video game system of FIG. 1.

Referring again to FIGS. 2a and 2b and to FIG. 6, the four data output lines (K1, K2, K4, K8) from multiplexer 100 are connected to the keyboard input terminals 16 of microprocessor 15 to provide to microprocessor 15 joystick positional information and keyboard information from remote control units 12a and 12b, memory information from RAM 120 which has been stored in register 121 or a random number provided by horizontal and vertical counters 135 and 137. Digit terminals ($D_0-D_{12}$) 18 provide scanning signals to scan the joystick and keyboard scan lines 230-236 of both remote control units 12a and 12b, simultaneously; the information is read from a particular one of joystick controls 12a or 12b by the state of data multiplexer 100 which is controlled by microcomputer 15. Microcomputer 15, which is, as previously described, contained in plug-in unit 87, includes a ROM 24 for storage of a game-generating/controlling program, the game-generating/controlling program causing microcomputer 15 to operate in a particular manner in accordance with the data sampled at keyboard input terminals 16 to control television set 10 to provide a particular set of game images on the display screen thereof. Output data from microcomputer 15 is provided at digit terminals ($D_0-D_{12}$) 18 and segment terminals ($S_1-S_8$) 17.

In order to better understand the operation of the video game system, the TMS 1100 microcomputer utilized in the present embodiment, will next be described.

MICROCOMPUTER 15

A block diagram of the microcomputer (TMS 1000/1100) 15, which is shown in FIG. 6, will next be described. For a more complete description of the microcomputer circuit, reference may be made to U.S. Pat. No. 3,988,604 for an ELECTRONIC CALCULATOR OR DIGITAL PROCESSOR CHIP HAVING MULTIPLE FUNCTION ARITHMETIC UNIT OUTPUT, said patent being assigned to the assignee of the present invention. Microcomputer system 15 is centered around a ROM (read-only-memory) 24 and a RAM (random-access-memory) 25. The ROM 24 contains 1024 instruction words of eight bits per word, and is used to store the program which operates the system. The RAM 25 contains 256 memory cells software organized as four 16-digit groups with four bits per digit. Data entered by the joystick or keyboard is stored in RAM 25, along with intermediate and final results of calculations, as well as status information or "flags," decimal point position and other working data. The RAM functions as the working registers of the microcomputer system, although it is not organized in a hardware sense as separate registers as would be true if shift registers or the like were used for this purpose. The RAM is addressed by a word address on lines 26, i.e., one out of sixteen word lines in the RAM is selected, by means of a combined ROM and RAM word address decode circuit 27. One of four "pages" of the RAM is selected by an address signal on two lines 28 applied to a RAM page address decoder 29 in the RAM. For a given word address on lines 26 and page address on lines 28, four specific bits are accessed and read out on RAM I/O lines 30, via input/output circuit 31, to RAM read lines 32. Alternatively, data is written into the RAM 25 via the input/output circuitry 31 and the lines 30. The same sixteen line 26 used as RAM word address are also used to generate the joystick and keyboard scan on the lines 18; to this end the lines 26 pass through the RAM 25 and are connected to output registers and buffers as will be explained.

The ROM 24 produces an eight-bit instruction word on ROM output lines 33 (the bits of the instruction word being labeled R0-R7) during each instruction cycle. The instruction is selected from 8192 bit locations in the ROM, organized into 1024 words containing eight bits each. The words are divided into 16 groups or pages of 64 words each. To address an instruction in the ROM requires a one-of-sixty-four ROM word address on lines 34 and a one-of-sixteen ROM page address on lines 35. The ROM word address on lines 34 is generated in the same decoder 27 as used to generate the RAM word address on lines 26. The ROM word address is a six-bit address produced in a program counter 36 which is a six-stage shift register that may be updated after an instruction cycle or may have a six-bit address loaded into it via lines 37 from ROM output lines 33 for a call or branch operation. The RAM and ROM word address decoder 27 receives a six-bit encoded address on lines 38 from decode data select unit 39 which has two inputs. The unit 39 receives a four-bit address from RAM Y register 40 via lines 41, or it receives a six-bit address from the program counter 36 via lines 42, during each instruction cycle. A six-bit subroutine register 43 is associated with the program counter 36 to serve as temporary storage for the return word address during subroutine operations. A six-bit address is stored in the register 43, via lines 44 when a call instruction is initiated so that this same address may be loaded back into the program counter 36 via lines 45 when execution of the subroutine which begins at the call location has been completed; this conserves instruction words and makes programming more flexible. The ROM page address on lines 35 is generated in a page address register 46 which also has a buffer register 47 associated with it for subroutine purposes. The register 46 will always contain the current page address for the ROM, and directly accesses the ROM page decoder. The buffer register 47 is a multifunction buffer and temporary storage register, the contents of which can be the present ROM page address, an alternate ROM page address, or the return page address during subroutine operations. The program counter, subroutine register and ROM page addressing are all controlled by control circuitry 48 which receives inputs from the ROM output lines 33 via lines 49. The control circuitry 48 determines whether branch and call on "status" or subroutine operations are performed, causes loading of an instruction word into the program counter and/or page address register, controls transfer of bits to the subroutine or buffer registers and back, controls updating of the program counter, etc.

Numerical data and other information is operated upon in the system by a binary adder 50 which is bitparallel adder having a precharged carry circuit, operating in binary with software BCD correction. The input to the adder 50 is determined by an input selector 51 which receives four-bit parallel inputs from several sources and selects from these what inputs are applied to the adder. First, the memory read or recall lines 32 from the RAM 25 provide one of the alternatives. Two registers receive the adder output, these being the "RAM Y" register 40 and an accumulator 52, and each of these has output lines separately connected as inputs 53 and 54 of the selector 51. A fourth input 55 receives an output from "CKB" logic as will be explained. Thus, the adder input is selected from the following sources: data memory or RAM 25 on lines 32; accumulator 52 via lines 53; RAM Y register 40 via lines 54; constant, keyboard or "bit" information from CKB logic 56 on lines 55. Positive and negative inputs to the adder 50 on lines 57 and 58 are produced from the selector circuitry 51.

The output from the adder 50 is applied to either or both the RAM Y register 40 and the accumulator 52 via lines 59. All of the operations of the adder 50 and its input selector 51, etc., are controlled by a data path control PLA 60 which is responsive to the instruction word on lines 33 from the ROM. Control outputs 61 from the control PLA 60 are indicated by dotted lines. The four-bit output from the accumulator can be applied via lines 53 to an accumulator output buffer 62 and thus to a segment decoder 63 for output from the system. The segment decoder 63 is a programmable logic array like that disclosed in the Ser. No. 163,565, and produces up to eight segment outputs on lines 64 which are applied to a set of eight output buffers 65. The output arrangement contains memory in the buffer 62 so that an output data can be held for more than one machine cycle. Output is under control of the data control logic PLA 60 which is responsive to the instruction word on lines 33 from the ROM.

A status logic circuit 66 provides the function of examining for carry or compare from the adder 50, and determining whether to branch or call. To this end, inputs from the adder 50 via lines 67, and input from the control PLA 60 via lines 61 are provided. The status logic 66 includes a latch which produces an output 69 to the output buffer register 62; this can be decoded out via segment decode 62 in many different ways. In the video game system, it is used as the most significant bit of a 5-bit data bus which is transferred out of the $S_1$-$S_5$ lines 17.

A control circuit 70 determines what and when data is written into or stored in the RAM 25 via input/output control 31 and lines 30. This RAM write control 70 receives inputs from either the accumulator 52 via lines 53 or the CKB logic 56 via lines 55, and this circuit produces an output on lines 71 which go to the RAM I/O circuit 31. Selection of what is written into the RAM is made by the instruction word on lines 33, via the data path control PLA 60 and command lines 61. An important feature of the system is that constants or keyboard information, from CKB logic 56, as well as the adder output via the accumulator, may be written into the RAM, via the write control 70, and further the CKB logic 56 can be used to control the setting and resetting of bits in the RAM, via the write control 70.

The RAM page address into which data is written is determined by two bits of the instruction word on lines 33, as applied via lines 72 to a RAM page address register 73 and thus to lines 28 which select the RAM page. The RAM word or Y address is, of course, selected by the contents of RAM Y register 40, select circuit 39 and decoder 27.

The four keyboard inputs 16 appear on lines 75, from which an input to the CKB logic 56 is provided. In normal operation, a keyboard input goes via CKB logic 56 to the accumulator 52 or RAM Y register 40, from whence it is examined by software or ROM programming. In manufacture of the chips, a test mode is possible, where the keyboard input on line 75 can be entered directly into the ROM page buffer address register 46, as will be explained. Also, during hardware clear using the KC input, the K lines can be entered into the page address register, or a K line can be used as an interrupt, in non-calculator applications.

Also included within the processor 15 is a clock oscillator and generator 80 which generates internally a basic clock frequency of about 500 kHz or less, and from this, produces five clocks 01 to 05 used throughout the system. A powerup-clear circuit 82 produces controls which clear the calculator when the power is turned on. This may be also supplemented by the KC input with an external capacitor.

The outputs 18 from processor 15, used for keyboard and joystick scanning, are generated from the RAM word address on lines 26 by an output register 84 which is loaded under control of lines 61 as addressed by RAM word lines 26. The output from the register 84 is connected via lines 85 to a set of output buffers 86. Sixteen outputs are possible, but only eleven are provided as outputs from the TMS 1100.

It is important that the register 84 is a random access register, where all bits are separately, independently, and mutually exclusively addressed. In this embodiment, only thirteen stages are provided in the register 84, so only the first thirteen of the sixteen address lines 26 are used. When one of the thirteen bits in the register 84 is addressed from decoder 27, this bit may be either set or reset as determined by controls 61 from the control PLA, i.e., from the current instruction word. The bit will remain set or reset until again specifically addressed and changed; meanwhile, any or all of the other bits may be addressed and set or reset in any order. Thus, it is possible to have any combination of D register bits either set or reset, providing $2^{11}$ or 2048 code combinations on the output lines 18. During power up or hardware clear, all the bits of the register 84 are unconditionally reset.

Similar to the register 84, the other output register 62 is static in that the contents once entered will remain until intentionally altered. The output register 62 functions as an output data buffer while the accumulator 52 and status latch 66 are being manipulated to form the next output. The output register 84 is a similar buffer for outputting the contents of the Y register 40, but has the additional feature of being fully random access. The data source for the Y register 40 are the following: a four-bit constant stored in ROM 24 as part of an instruction word; the accumulator 52 transferred to the Y register 40 via the selector 51 and adder 50; and data directly from the RAM 25. Once data is in the Y register 40, it can be manipulated by additional instructions such as increment or decrement.

Figure 7A:
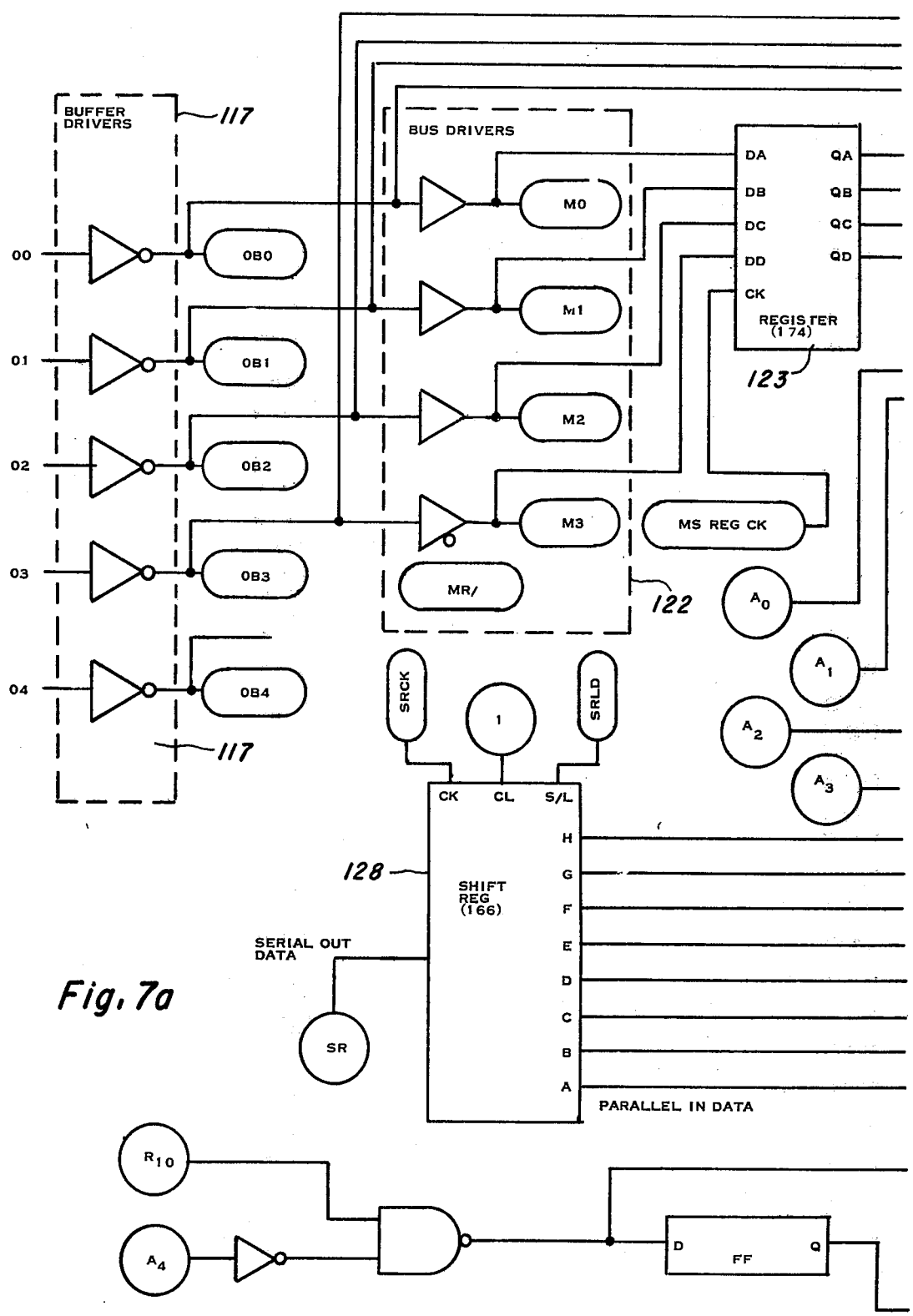
FIGS. 7a and 7b comprise a circuit diagram of the character table memory and character generator memory.
Figure 8:
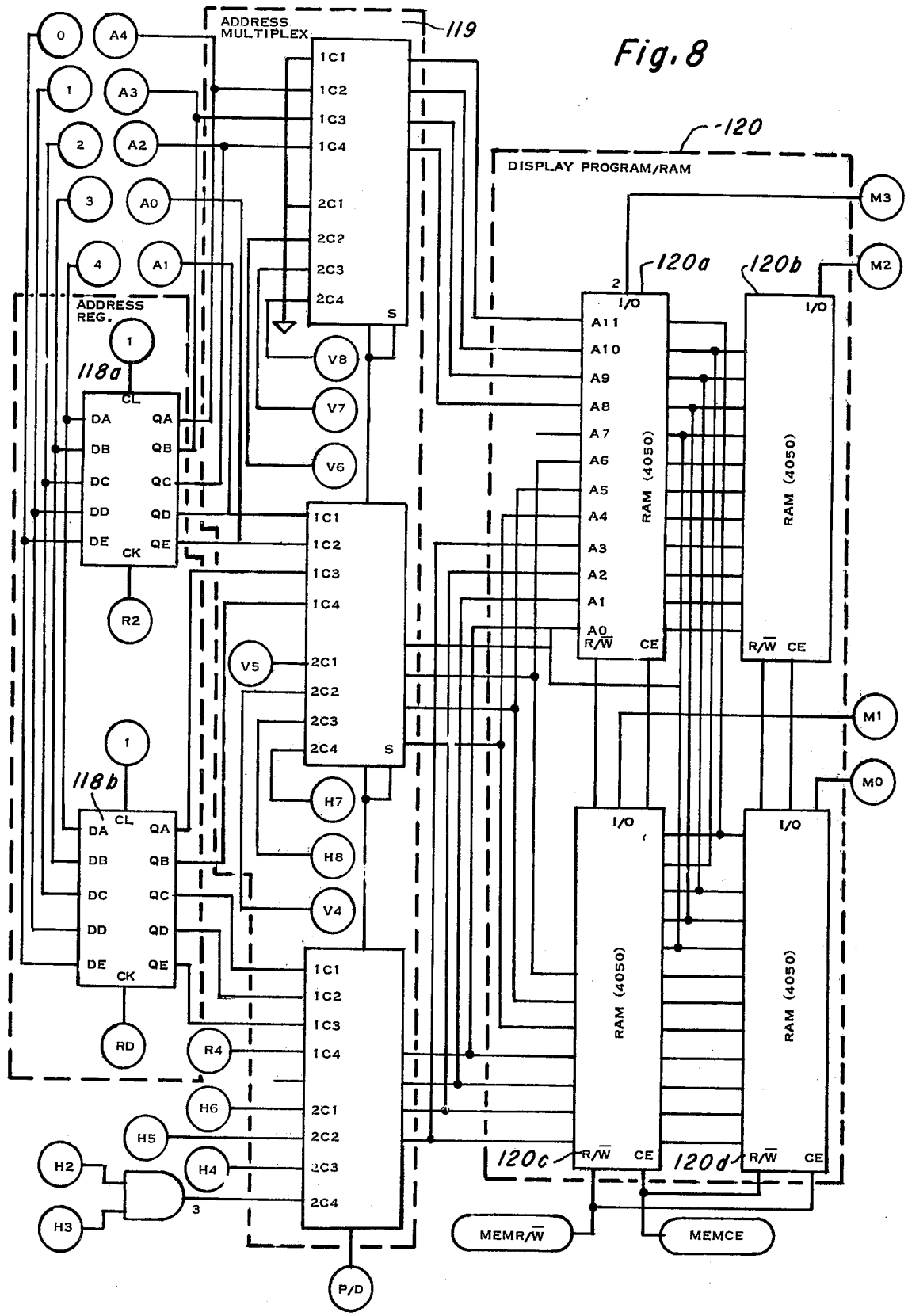
FIG. 8 is a circuit diagram of the display memory.

Referring again to FIGS. 2a and 2b, the data, which is output from microcomputer 15 via selected ones of the segment output terminals ($S_1$-$S_8$) 17 are coupled by means of buffer drivers 117 to address registers 118 and to the data input terminals of main color and character display random access memory (RAM) 120 and set table RAM memory 126. Buffer drivers 117 are shown in detail in FIG. 7a, and the horizontal and vertical address registers 118 are shown in detail in FIG. 8. As illustrated in FIG. 8, address register 118 is comprised of two SN54/74LS174 integrated register circuits 118a and 118b.

MEMORY ORGANIZATION

Figure 15A:
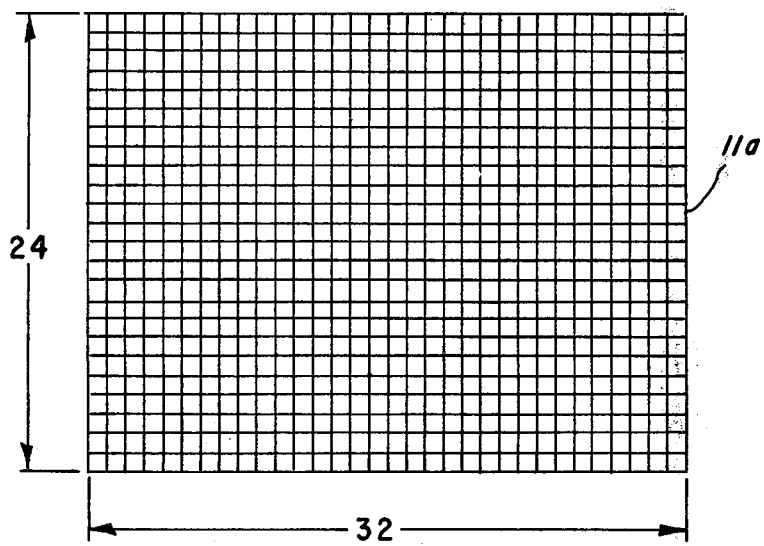
FIG. 15a is a graphic representation of the display matrix.
Figure 15B:
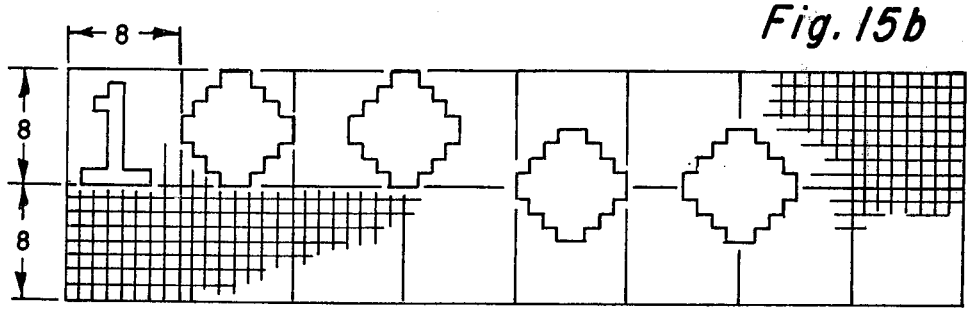
FIG. 15b is a graphic representation of the character matrix including exemplary characters.

In order to best understand the memory organization, which comprises a novel feature of the video game system, reference is here made to FIGS. 15a–15c. Referring to FIG. 15a, the display 11a of television set 11 has a 3:4 aspect ratio, and is, therefore, organized as a 32 horizontal by 24 vertical matrix. Each square within the "display" matrix is, itself, composed of an 8-by-8 "character" matrix. The characters are any patterns which can be drawn on an 8-by-8 grid as exemplified in FIG. 15b. If a single random access memory were to be provided to store a total 8-by-8 character, its color and the background color for each character in the display matrix, a memory on the order of 150K bits would be required. By utilizing, instead, the novel memory organization embodied in the present video game system, the memory required to provide the 768 8-by-8 characters to fill the display is reduced to less than 8K bits of random access memory.

In the present system, main random access memory 120 is loaded by microcomputer 15 with a display program. Random access memory 120 is 1K by 8; the 1K is organized as 32 by 32 with 32 by 24 8-bit words representing the 32 horizontal and 24 vertical squares of the display matrix and the remaining 32-by-8 8-bit words utilized as working storage registers. Thus, corresponding to each square in the display matrix is an 8-bit word in random access memory 120. This 8-bit memory word is partitioned into two 4-bit bytes as illustrated in FIG. 15c. There are 32 character sets with 16 characters in each set. The lower-order byte of the memory word in random access memory 120 selects one of 16 characters of a character set in ROM character generator 127. The higher-order byte points to a table contained in random access color and character set memory 126. Memory 126 is organized as a 16-by 8-bit word memory. Each word in the table contained in memory 126 contains color and character set information. Thus, as shown in FIG. 15c, the high-order 3-bit byte indicates to composite video generator 129 the color of the character, and background color register 142 indicates the background color for the character. The lower-order byte of each 8-bit memory word of memory 126 is five bits, and is utilized to address the one of 32 character sets of character generator ROM 127. Three bits from vertical counter 137 are used to complete the address of character generator ROM 137 by selecting which line of the character is to be read from ROM 127; thus, for each character to be displayed, 8 lines will be separately read, each line containing eight horizontal squares of "character" information.

With the above character addressing scheme, 32 character sets of 16 characters each, a total of 512 different characters can be addressed and selectively displayed in the 768 "display" matrix squares. 128 8-by-16 characters are stored in one 1K-by-8 character generator ROM, and additional ROM's may be added to increase the character set. The entire 24-by-32-by-64 TV screen grid is defined by a 1K-by-8 random access memory 120. The colors defined by the 3-bit byte from the table contained in memory 126 are defined in TABLE I below.

TABLE I

| 3-BIT COLOR CODE | | | RESULTANT CHARACTER COLOR |
|---|---|---|---|
| R | B | G | |
| 0 | 0 | 0 | BLACK |
| 0 | 0 | 1 | GREEN |
| 0 | 1 | 0 | BLUE |
| 0 | 1 | 1 | CYAN |
| 1 | 0 | 0 | RED |
| 1 | 0 | 1 | YELLOW |
| 1 | 1 | 0 | MAGENTA |
| 1 | 1 | 1 | WHITE |

Now that the memory organization has been described in terms of data flow, reference is again made to FIGS. 2a and 2b so that the memory organization in terms of the presently-implemented hardware embodiment is best understood.

When data is to be stored in address registers 118, the two control lines from microcomputer 15 are used to clock the data on the data bus into the respective address registers 118a and 118b. The address stored in address register 118 is then utilized to addressing a storage location of RAM 120 (or as will later be discussed RAM 126). Address multiplexer 119, shown in detail in FIG. 8, selects between the address contained in address registers 118 and a counter value determined by the count contained in horizontal and vertical counters 135 and 137. Address multiplexer circuitry 119 is comprised of three SN54/74LS157 integrated selector circuits connected as shown in FIG. 8.

The display/program RAM 120 is comprised of four TMS4050 integrated random access memory circuits 120a-120d as shown in FIG. 8. When information is being stored in random access memory 120, address multiplexer 119 enables the address contained in address register 118 to address RAM 120. The same addressing procedure occurs when information is being read from RAM 120 to be utilized by microcomputer 15. Whenever information is being read from RAM 120 to be displayed, address multiplexer 119 selects the horizontal and vertical counters 135 and 137 to provide the proper memory address; counters 13 and 137 provide the information as to the location containing the display data which needs to be displayed at that particular point in time.

In writing data into RAM 120 with the address stored in address register 118, the data is provided to the data input terminals of RAM 120 by microcomputer 15 via buffer drivers 117 and 122. Three control lines from microcomputer 15 to memory timing circuit 140 are used to generate control signals for the RAM 120 to write the information present on the data bus from buffer drivers 117 into the location indicated by the contents of address register 118. Memory timing circuit 140 is illustrated in detail in FIG. 11b. If microcomputer 15 requires the retrieval of information that is contained in RAM 120 (note that an 8 by 32 word section of RAM 120 is utilized as working storage space), the address register is set to the desired location of RAM 120 as indicated above, but the control signals going from microcomputer 15 to memory timing circuit 140 would indicate that the information is to be read from the RAM rather than being written into the RAM 120. In this case, data from RAM 120 is read and stored in multiplex register 121 as previously described with respect to the description of FIG. 5. The data contained in multiplex register 121 may then be selected by microcomputer 15 via data multiplexer 100. Data multiplexer 100, which is controlled by two control lines from microcomputer 15, would then make the data as stored in register 121 available on keyboard input terminals 16 of microcomputer 15.

Figure 7B:
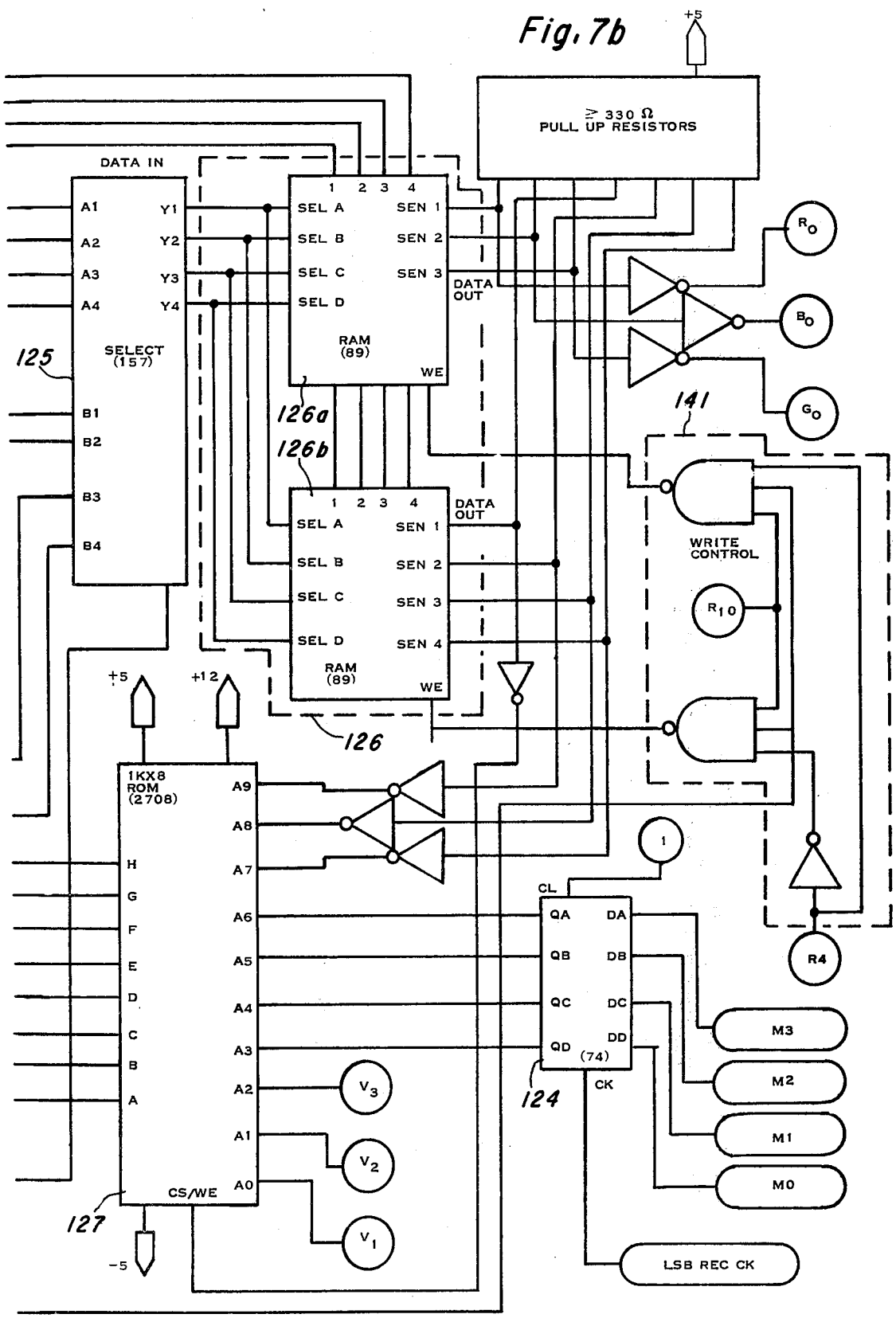

As previously discussed, 32 by 24 8-bit word registers of 1K by 8 RAM 120 store the data to be displayed on the screen of television set 10 as such data is generated by microcomputer 15. The information is stored in memory 120 as character set information: the characters themselves are not stored but generated in linear (horizontal) sections just prior to being displayed. The four least significant bits of the eight-bit word defines one of 16 characters of a character set, and the four most significant bits point to a location in a table, the table being contained in 16 by 8 RAM 126. As illustrated in FIG. 7b, RAM 126 is comprised of a pair of SN54/7489 integrated circuit RAMs 126a and 126b. RAM 126 is addressed by either an address (A0-A3) applied to selector circuit 125 by address register 118a or an address (M0-M3) derived from RAM 120 via bus drivers 122 which is stored in register 123. Address multiplexer 125 selects which of the two addresses is to address RAM 126. A0-A3 is selected in writing the table and M0-M3 is selected in reading characters in the display cycle. As illustrated in FIGS. 7a and 7b, register 123 is comprised of an SN54/74LS174 integrated circuit register and address multiplexer 125 is comprised of an SN54/74LS157 integrated selector circuit.

As previously discussed, RAM 126 contains color and character set information. The three most significant bits of each of the 8-bit words in RAM 126 indicate the color of the character; while the 5 lower-order bits define one of 32 character sets. By utilizing these five lower-order bits plus the four lower-order bits derived from RAM 120 which are stored in register 124, one of the 512 possible characters are selected from ROM character generator 127. Microcomputer 15 loads RAM 126 in a similar manner to the loading of RAM 120. The address is set in address register 118a and the data is put on the data bus via buffer drivers 117. A control signal provided to write control logic 141 causes the information on the data bus to be stored in the addressed location of RAM 126. Write control logic 141 which is comprised of a plurality of logic gates is illustrated in detail in FIG. 7b.

When information is being displayed, horizontal and vertical counters 135 and 137 keep track of the position on the display at which the information is to be displayed. Lower-order bits of horizontal counter 135 are decoded and used for memory timing. The higher-order bits are decoded and used both for horizontal sync timing and as part of the address to RAM 120. The vertical counter 137 lower-order bits are used as an address to the character ROM where the upper bits are decoded and used to generate vertical sync and also as the vertical address for RAM 120.

The three high-order bits output by RAM 126 go to the composite video generator 129 which is illustrated in detail in FIGS. 13a and 13b to provide character color while, as previously indicated, the lower five bits go to the character generator 127 to select the character set. The address word from the character ROM 127 is read out in eight bits and loaded into a SN54/74LS166 integrated shift register circuit 128 which is illustrated in FIG. 7a. The character data is then shifted out of shift register 128, serially (SR), into composite video generator 129. Also applied to composite video generator 129 is background color information provided by background color register 142 which is comprised of an SN54/74LS174 register as shown in FIG. 14.

Figure 11B:
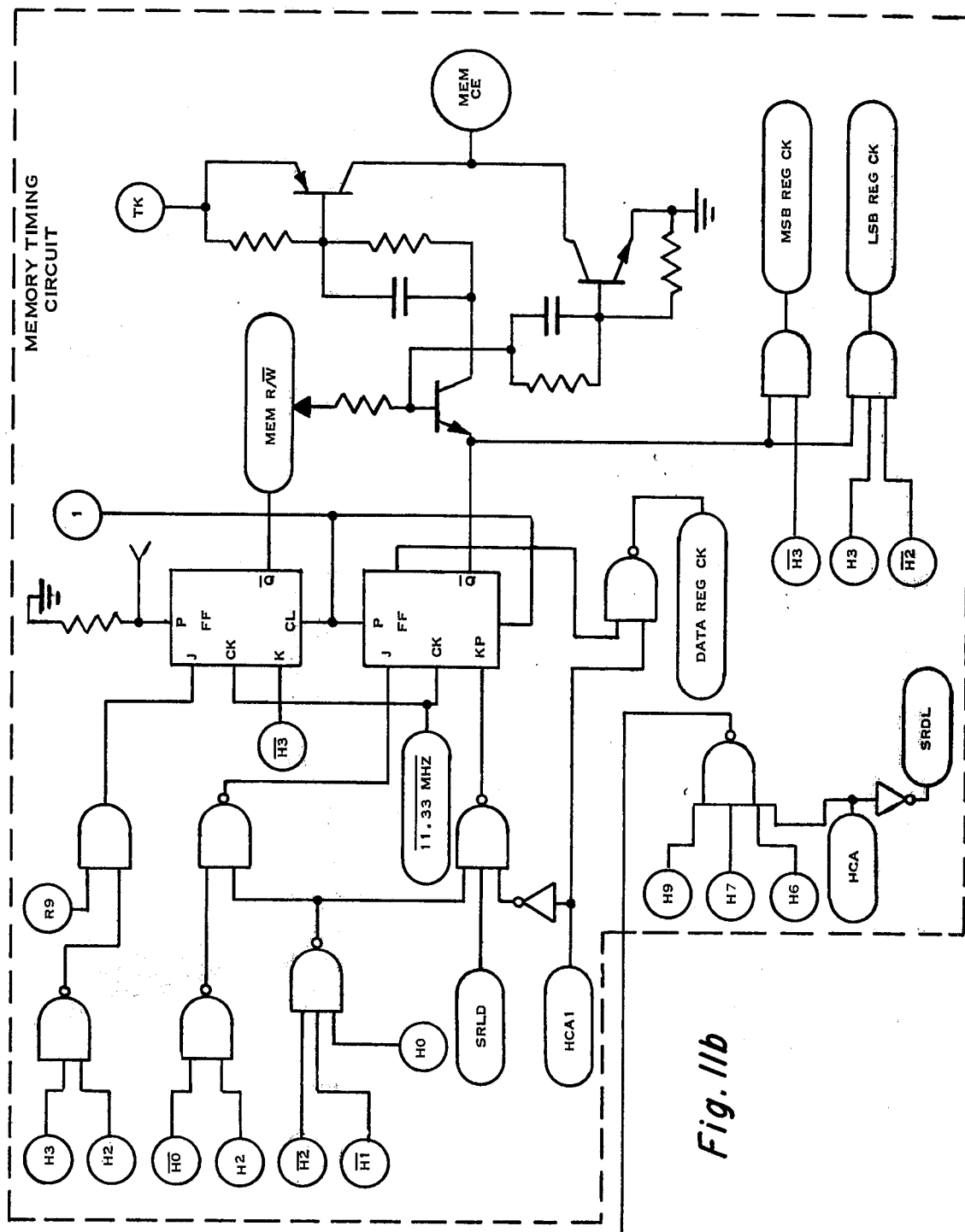
FIG. 11b is a circuit diagram of the memory timing circuit.
Figure 13:
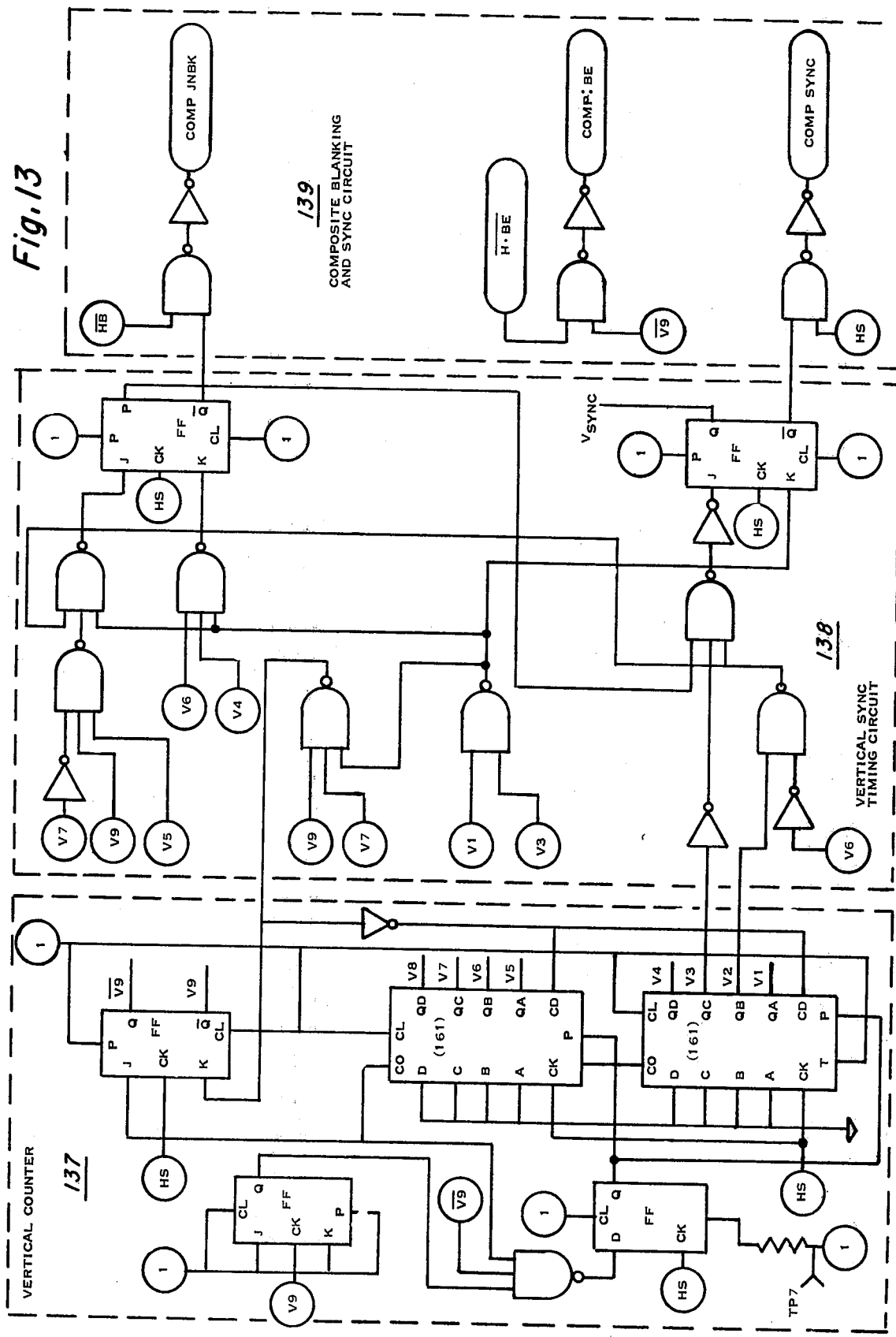
FIG. 13 is a circuit diagram of the vertical counter and sync timing circuits, and a circuit diagram of the composite blanking and sync circuits.
Figure 14:
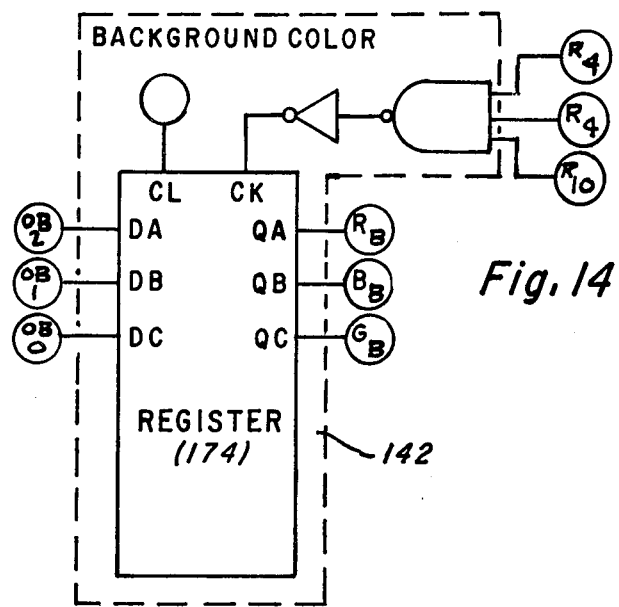
FIG. 14 is a circuit diagram of the background color generator.

Horizontal counter 135 is illustrated in detail in FIG. 11a and vertical counter 137 is illustrated in detail in FIG. 13. Lower-order bits of horizontal counter 135 are decoded and used for memory timing via memory timing circuit 140 which is illustrated in detail in FIG. 11b. Horizontal and vertical counters 135 and 137 are driven by 11.33-mHz oscillator 134 which is illustrated in detail in FIG. 10.

Figure 12:
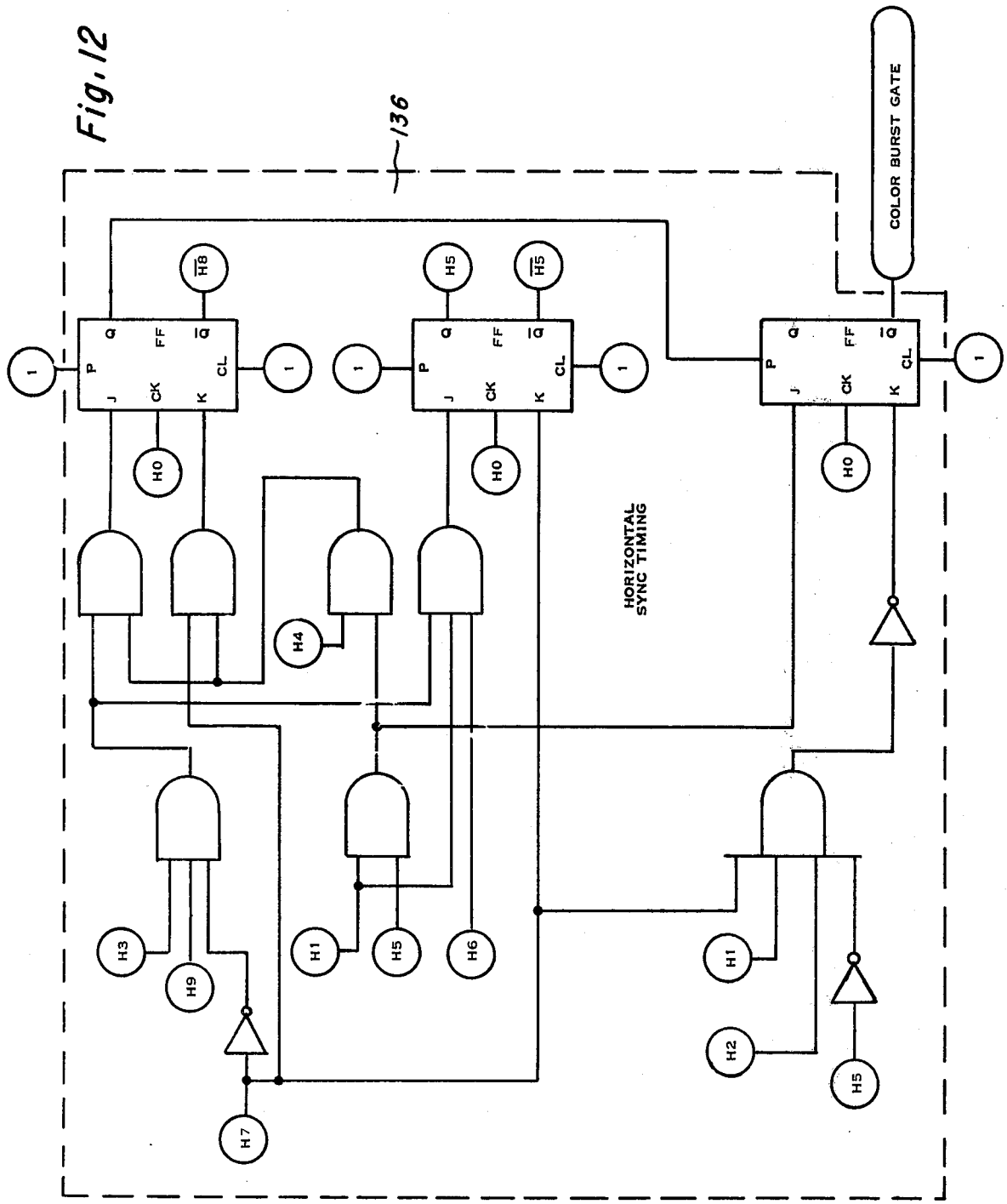
FIG. 12 is a circuit diagram of the horizontal sync timing circuit.

The higher-order bits of horizontal counter 135 are decoded and used by horizontal sync timing circuit 136 which is illustrated in detail in FIG. 12 and are used as part of the address to RAM 120. The three lower-order bits from vertical counter 137 are used to address character ROM 127 and the higher-order bits of counter 137 are decoded and used by vertical sync timing circuit 138, which circuit is illustrated in detail in FIG. 13, to generate the vertical sync, and are also used as the vertical address for display RAM 120 as previously discussed.

Figure 9A:
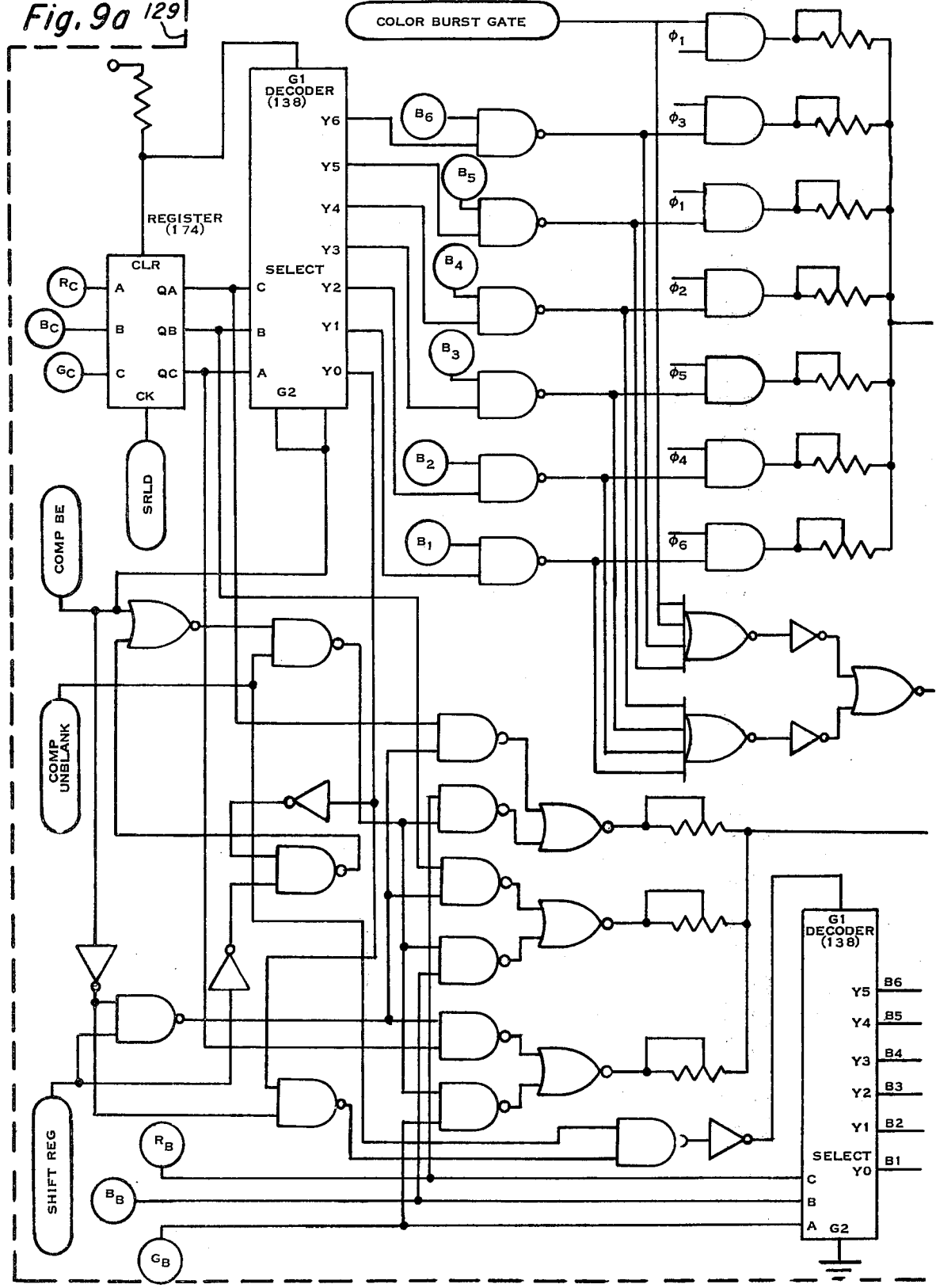
FIGS. 9a and 9b comprise a circuit diagram of the composite video generator.
Figure 9B:
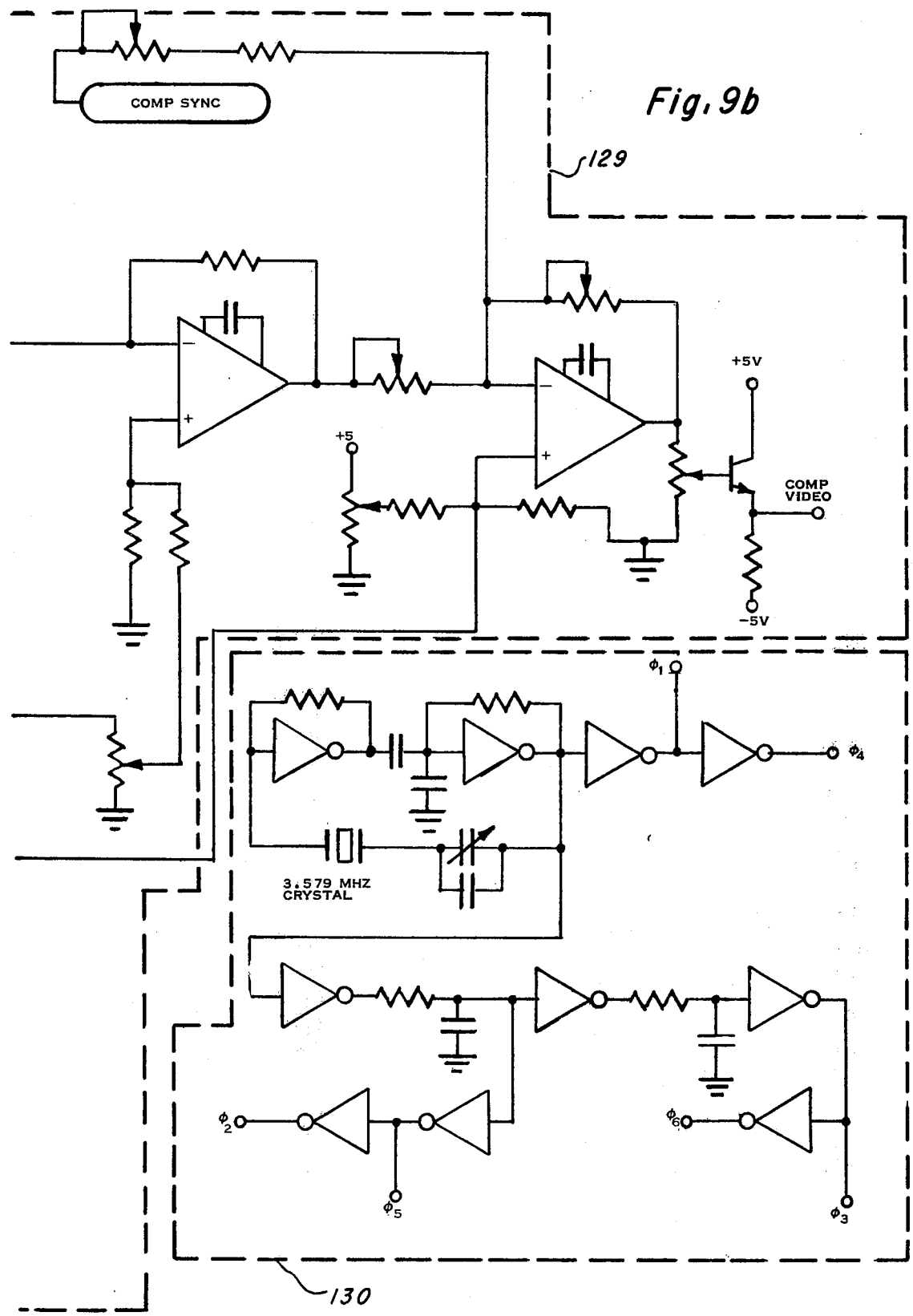

The horizontal timing which is generated by horizontal sync timing circuitry 136 provides the color burst gate signal to composite video generator 129. Other horizontal sync timing signals are provided by timing circuit 136 to the composite blanking, and sync generator 139 which is illustrated in FIG. 13. The horizontal blanking, and sync signals are combined with the vertical timing signals from vertical timing sync generator 138 to provide the composite blanking and sync signals which are applied to composite video generator 129 as illustrated in FIGS. 9a and 9b.

Utilizing the input video shift register 128, the composite blanking signals from composite blanking and sync generator 139 and the other timing signals provided by memory timing circuit 140 and horizontal sync timing generator 136, composite video generator 129 produces a video signal. A 3.579-mHz crystal oscillator circuit 130, which is illustrated in detail in FIG. 9b, is utilized to generate the color burst reference signal. This signal is then phase shifted to produce six different reference signals, one for each of the colors of TABLE I.

The composite video signal provided by generator 129 is applied to an RF modulator 131 which modulates the composite video signal onto an RF carrier. The RF modulated signal from modulator 131 is applied to RF antenna switch 132 which is generally used to connect a video game to the antenna terminals of a TV set. Switch 132 is utilized to switch between the antenna and the video game.

Example of a Video Game Sequence

"Doodle" is an example of a game played utilizing the above described video game system. One of the joystick controls 13a is used in this game to control the location of a cursor on the display screen of television set 10 and keyboard 14a is used to control the color of the cursor such that when selected ones of the keys of keyboard 14a are activated, the color of the cursor changes. The indicated color then remains as a colorace on the screen.

A cartridge 87 containing a microcomputer with the "Doodle" game is inserted in slot 88. Periodically, during a pass through the main video game determining program stored in the ROM 24 of the microcomputer 15 contained in the cartridge 87, the program branches to a subroutine which is used to scan keyboard 14a, and read the states thereof into keyboard input terminals 16 via data multiplexer circuit 100. The program then interrupts to store the data received at terminals 16 into the microcomputer accumulator 52 and the key decoded. Once microcomputer 15 has decoded which one of the keys is depressed it proceeds to a routine which will, in the present example, change the color of the character on the screen by writing into internal RAM 25. This information will record flags that directly relate to the color desired to be displayed on the screen.

At this point, microcomputer 15 is ready to receive input signals from joystick 13a. In accordance with a novel feature of the present game system, movement of joystick control 13a from the center position in any direction indicates only the "direction" in which the cursor is to move; unlike prior art video game systems, joystick movement does not relate to the "position" of the cursor on the screen. Thus, moving the joystick control 13a does not move the cursor to a corresponding position on the screen; instead, joystick control 13a indicates the direction of movement, and the movement proceeds in that direction automatically until the joystick is returned to the central vertical "0" position.

The degree of movement of the joystick control 13a from the central vertical "0" position indicates the relative speed that the cursor will move in the selected direction.

Thus, two digital signals are received in sequence by microcomputer 15 at keyboard inputs 16; the first being the digital joystick X axis code, and the second being the digital joystick Y axis code which together indicate the exact X-Y coordinates of the digital joystick to microcomputer 15. Detecting a value which relates to motion of the cursor, for example, a value of +4 for the digital joystick X axis and a value +6 for the digital joystick Y axis, the cursor proceeds to move along the directional vector (4, 6) at a relative speed of +5. If the values of the digital joysticks were +2 for the X axis, and +3 for the Y axis, the cursor would move along the same directional vector at a speed of +2.5, for example.

Using the inputs from digital joystick control 13a microcomputer 15 computes the position and symbol which is to be written on the display screen of television 10. Microcomputer 15 then writes this information into RAM 120 according to the flags which microcomputer 15 has stored in its internal memory 25. RAM 120 is then addressed under control of microcomputer 15 and the above described timing circuitry to provide the desired image on the display screen.

Various embodiments of the invention have now been described in detail. Since it is obvious that many additional changes and modifications can be made in the above-described details without departing from the nature and spirit of the invention, it is understood that the invention is not to be limited to said details except as set forth in the appended claims.

What is claimed is:

1. A digital joystick control comprising:
   (a) an elongated shaft member having a spherical ball at one end thereof;
   (b) first and second socket members coupled to said elongated shaft member to provide a swivel joint between said ball and said socket members for enabling pivotal movement, of said shaft member about said ball in any direction, movement of said shaft member effecting corresponding pivotal movement of said socket members;
   (c) first and second plate members respectively connected to said first and second socket members for pivotal movement therewith, said plate members having a patterned surface of conductive and non-conductive regions;
   (d) a plurality of wiper arms in opposing relation to said conductive and non-conductive regions of said plate members for engaging said patterned surfaces, the locations of the conductive and non-conductive regions of the patterned surfaces with respect to the wiper arms being changeable in response to movement of said shaft member whereby a unique digital-coded positional signal is generated for each predetermined incremental position of said shaft member.

2. The digital joystick control according to claim 1, wherein:
   (a) said first socket member comprises a cup-shaped member in which said ball is seated, said cup-shaped member having an elongated slot; and wherein
   (b) said second socket member comprises an arcuate strap extending about said cup-shaped member in traverse relationship thereto, said arcuate strap having an elongated groove disposed substantially perpendicular to the slot in said cup-shaped member; and wherein
   (c) said ball includes a pin member extending through the slot in said first socket member and into the groove in said second socket member thereby interconnecting said first and second socket members with said shaft member to provide said swivel joint between said ball and said socket members enabling movement of said shaft about said ball.

3. The digital joystick control according to claim 1 including a circuit board having a plurality of said conductive wiper arms mounted thereon, extending outwardly thereof.

4. The digital joystick control according to claim 1, wherein said first and second plates are arcuate in shape and fixably connected to said first and second socket members, respectively, for movement therewith.

5. A digital joystick control comprising:
   (a) a platform having a centrally-located circular opening provided therein;
   (b) a base member depending from said platform and having respective pairs of side and end support members defining a chamber in registration with the circular opening in said platform;
   (c) a joystick including an elongated shaft having a spherical ball on one end thereof, the elongated shaft of said joystick being disposed outwardly of said platform with said spherical ball being partially received within said chamber, and protruding outwardly of the circular opening in said platform;
   (d) first and second socket members mounted within said chamber, said first socket member comprising a cup-shaped member in which said ball is seated, said cup-shaped member having an elongated slot disposed substantially perpendicular to the side support members and being pivotably connected to said side support members for movement about an axis perpendicular thereto, said second socket member comprising an arcuate strap extending about said cup-shaped member in traverse relationship thereto, said arcuate strap having an elongated groove disposed substantially perpendicular to the end support members and being pivotably connected to said end support members for movement about an axis perpendicular thereto;
   (e) said ball having a pin member extending through the slot in said first socket member and into the groove in said second socket member thereby interconnecting said first and second members with said joystick to provide a swivel joint between said ball and said first and second socket members to enable movement of said shaft about said ball in any direction with respect to said platform;
   (f) first and second circuit boards mounted in fixed relation to said base member, each of said circuit boards including a plurality of conductive wiper arms extending outwardly thereof; and
   (g) first and second plate members fixably connected to said first and second socket members, respectively, for pivotal movement therewith, each of said plate members having a patterned surface presenting conductive and non-conductive regions in opposing relation to said circuit board with said wiper arms engaging the patterned surfaces of said plate members, the locations of the conductive and non-conductive regions of the patterned surface of said plate members with respect to said wiper arms being changeable in response to movement of the shaft member of said joystick.

6. The digital joystick control according to claim 5, wherein said plate members are arcuate in shape, said first arcuate plate member being mounted exteriorally with respect to one of said side support members, and said second arcuate plate being mounted exteriorally with respect to one of said end support members.

7. The digital joystick control according to claim 5, wherein each of said plate members are arcuate in shape.